US007801780B1

(12) United States Patent
Nearhood et al.

(10) Patent No.: US 7,801,780 B1
(45) Date of Patent: *Sep. 21, 2010

(54) METHOD AND SYSTEM FOR MANAGING MULTI-JURISDICTIONAL PROPERTY TAX INFORMATION

(75) Inventors: Richard D. Nearhood, Paradise Valley, AZ (US); Roger Sabin, Mesa, AZ (US); James A. Subach, Phoenix, AZ (US); J. Scot Crismon, Phoenix, AZ (US); J. Todd Parker, Paradise Valley, AZ (US)

(73) Assignee: Thomson Reuters (Tax & Accounting) Services Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/781,703

(22) Filed: Jul. 23, 2007

Related U.S. Application Data

(63) Continuation of application No. 09/812,305, filed on Mar. 19, 2001, now Pat. No. 7,249,072.

(60) Provisional application No. 60/190,154, filed on Mar. 17, 2000.

(51) Int. Cl.
G06F 17/22 (2006.01)
G07F 19/00 (2006.01)

(52) U.S. Cl. .............................. 705/31; 705/10; 705/38; 705/27

(58) Field of Classification Search ................... 705/27, 705/31, 32, 19, 10, 1, 400, 38, 30, 34; 707/1; 382/173, 209, 228
See application file for complete search history.

(56) References Cited

U.S. PATENT DOCUMENTS 5,394,487 A * 2/1995 Burger et al. ............... 382/209

(Continued)

FOREIGN PATENT DOCUMENTS

JP 8-305741 11/1996

OTHER PUBLICATIONS

Oklahoma County; Oklahoma County Assessor Home Page; http://www.oklahomacounty.org/assessor/ as retrieved from the wayback machine on Oct. 7, 1999 (see NPL document).*

(Continued)

*Primary Examiner*—Matthew S Gart
*Assistant Examiner*—Olusegun Goyea
(74) *Attorney, Agent, or Firm*—Fennemore Craig, P.C.

(57) ABSTRACT

A computer system for managing property tax information for a plurality of real estate parcels includes a data storage device, an output device and a processor. The processor maintains in the storage device a database of property tax data including a plurality of parcel records, each parcel record including a parcel identifier for each parcel of the plurality of real estate parcels, a tax year identifier for identifying the tax year applicable to each parcel, a state identifier for identifying the state in which each parcel is located and a jurisdiction identifier for identifying a jurisdiction within the state in which the parcel is located. The processor also maintains in the storage device a plurality of templates. Each template is associated with a tax assessing or billing entity, defines tax rules specific to the associated entity and is linked to at least one of: a state record for the state in which the parcel is located; a jurisdiction record for a jurisdiction within the state; or a system master record. The processor can receive an input requesting a report of information for a specified parcel record, retrieve a template from the stored templates based on the tax year identifier, the state identifier and the jurisdiction identifier linked to the retrieved template, generate the requested report using the retrieved template and the tax rules defined by the retrieved template, and output the requested report to the output device. A corresponding method for managing property tax information is also provided.

15 Claims, 24 Drawing Sheets

U.S. PATENT DOCUMENTS

| | | | | |
|---|---|---|---|---|
| 5,414,621 | A | * | 5/1995 | Hough ......................... 705/10 |
| 5,761,650 | A | | 6/1998 | Munsil et al. ................. 705/34 |
| 5,794,216 | A | * | 8/1998 | Brown ......................... 705/27 |
| 5,802,501 | A | | 9/1998 | Graff ........................... 705/36 |
| H001830 | H | * | 1/2000 | Petrimoulx et al. ........... 705/31 |
| 6,016,479 | A | | 1/2000 | Taricani, Jr. ................. 705/19 |
| 6,064,968 | A | | 5/2000 | Schanz ......................... 705/1 |
| 6,272,482 | B1 | | 8/2001 | McKee et al. ................. 706/47 |
| 6,446,047 | B1 | * | 9/2002 | Brier et al. .................... 705/35 |

OTHER PUBLICATIONS

Author Unknown, screen captures for Burr Wolff "PTS Corporate", Undated.*

Author Unknown, Screen captures for "Quantum for Property Tax", Sep. 21, 1998.*

Author Unknown, webpages from http://www.taxcomp.com/demo, May 24, 1999.*

Author unknown, web pages from "http://www.taxcomp.com/demo/companyorg.html", May 24, 1999.*

Author unknown, screen captures for "Quantum for Property Tax", Sep. 21, 1998.*

Author unknown, "Burr Wolff Tax Info Search" web pages from "http://www.burrwolf.com/tax" info, Apr. 28, 1999.*

Author unknown, screen captures for Burr Wolff "PTS Corporate", undated.*

Titus, K., "Technology and the art of locating hidden assets", *Commercial Law Bulletin*, v12n5:14-18, Sep./Oct. 1997.

Author unknown, web pages from http://www.taxcomp.com/demo, May 24, 1999.

Author unknown, "Burr Wolff Tax Info Search" web pages from http://www.burrwolf.com/tax info, Apr. 28, 1999.

Author unknown, screen captures for Burr Wolff "PTS Corporate", undated.

Author unknown, screen captures for "Quantum for Property Tax", Sep. 21, 1998.

http://www.oklahomacounty.org/assessor/TaxCalculator.htm, published Feb. 20, 1999.

http://www.taxnetusa.com/, published Nov. 17, 1999.

http://www.window.state.tx.us/taxinfo/proptax/proptax.html, published Jun. 26, 1998.

* cited by examiner

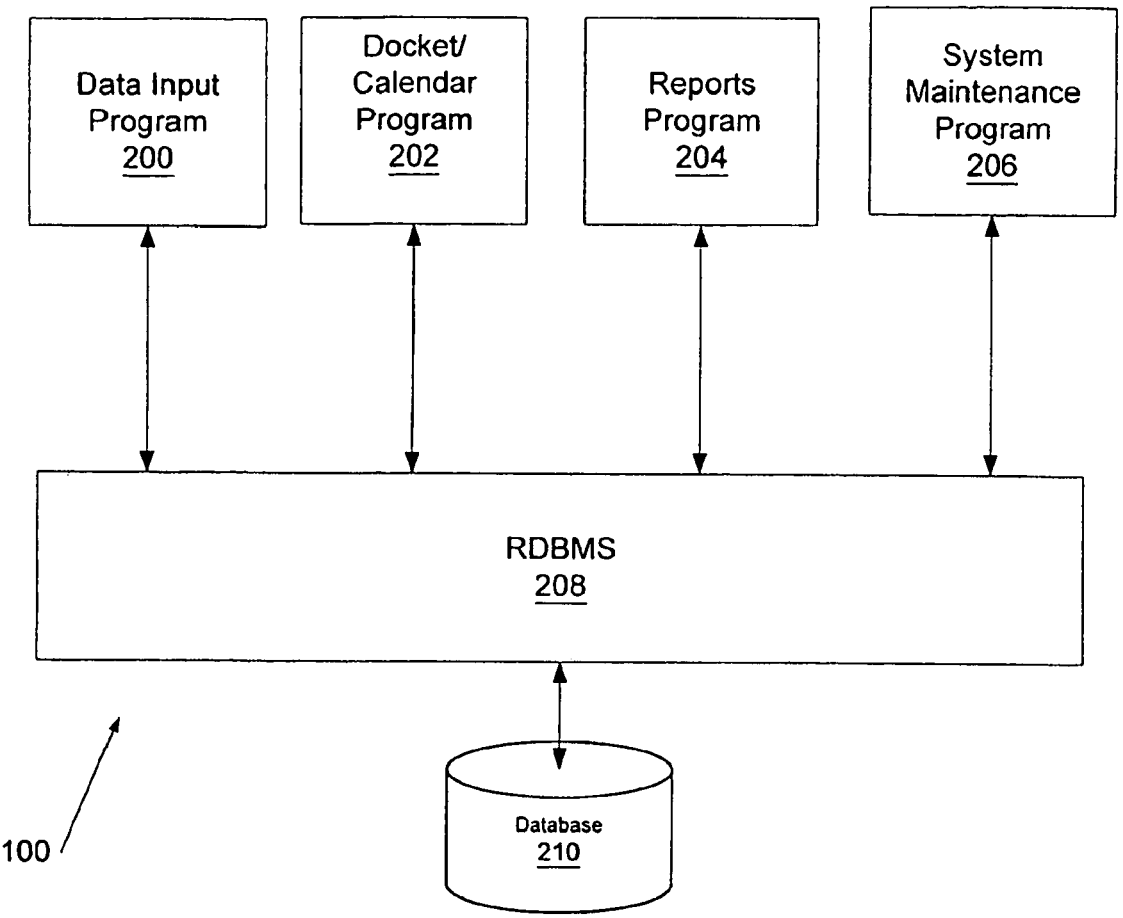
FIG. 2A
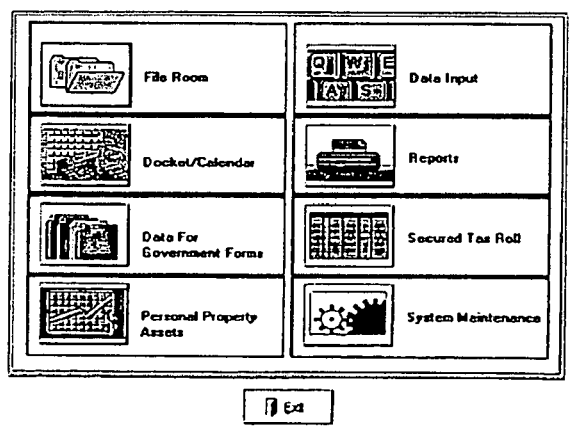
FIG. 2B Main Window

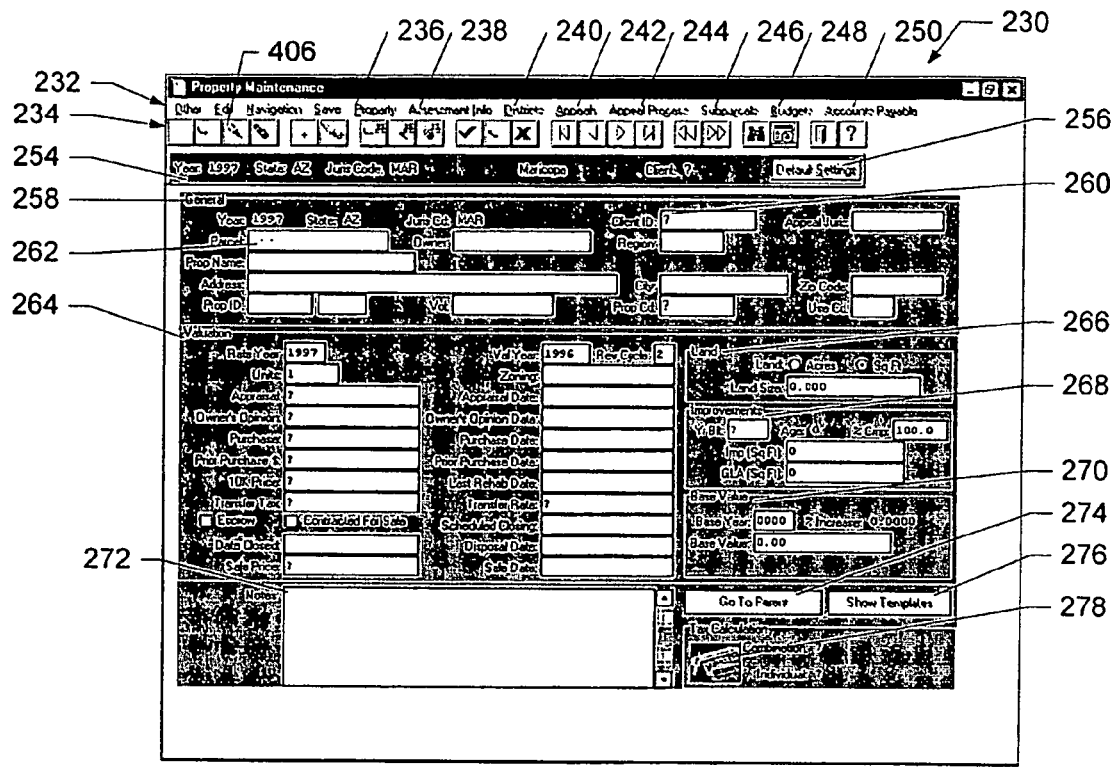
FIG. 4 Parcel Record
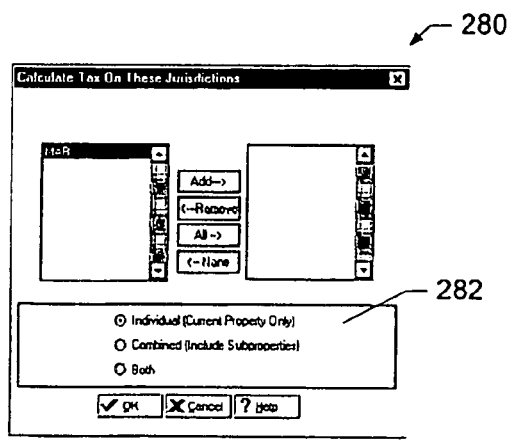
FIG. 5 Calculate Tax

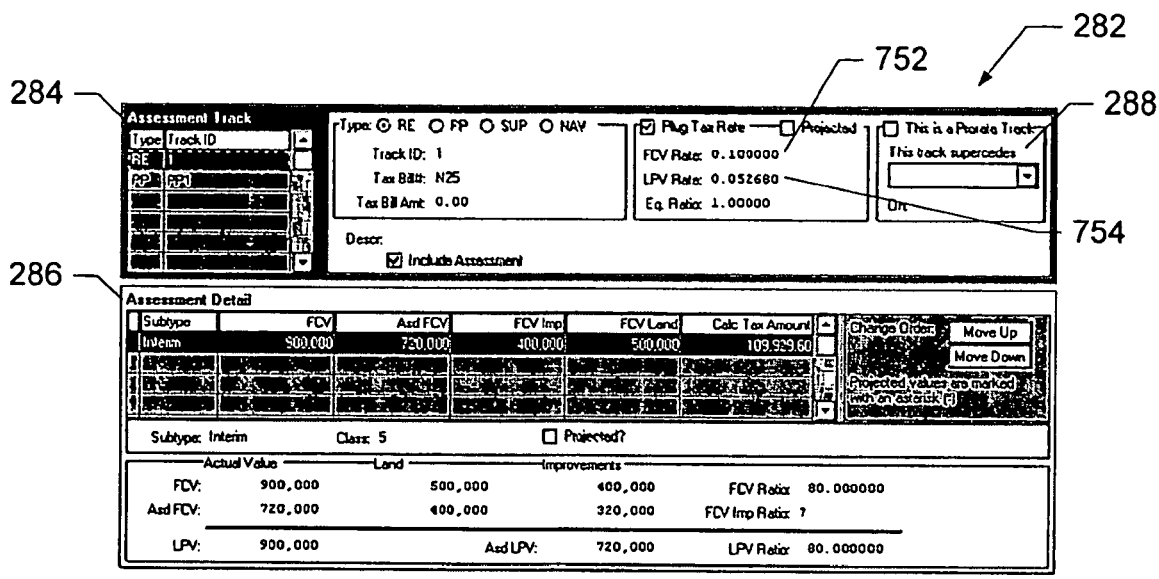
FIG. 6 Assessments
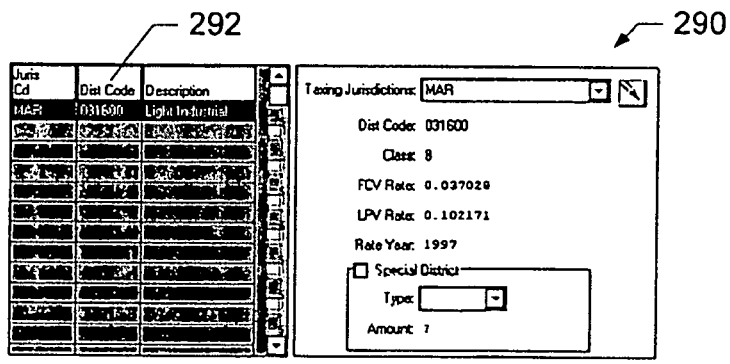
FIG. 7 Districts

FIG. 8 Appeal Record

FIG. 9 Appeal Billing

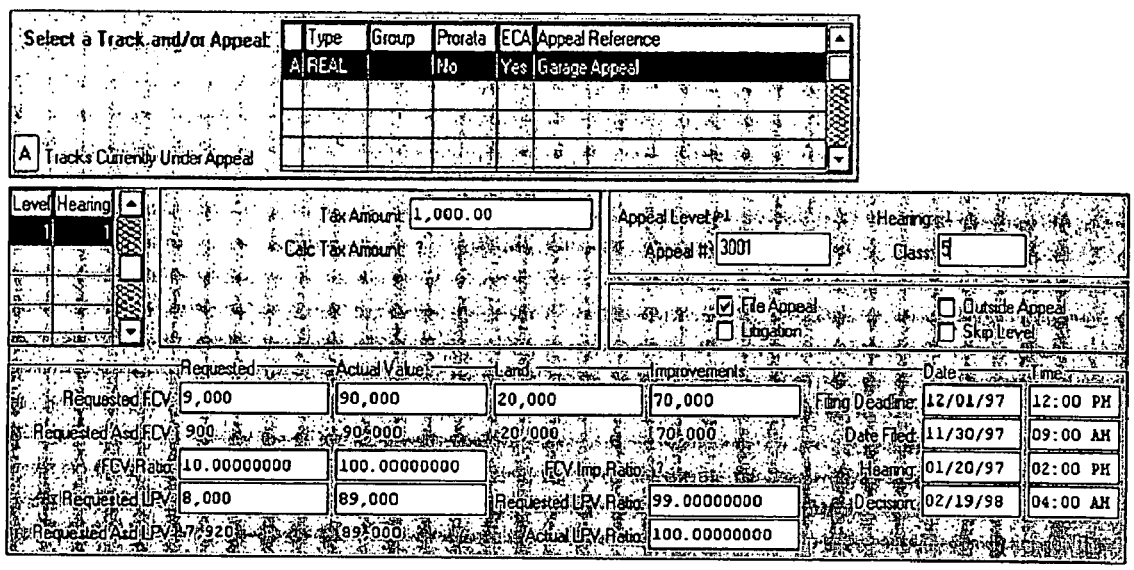
FIG. 10 Appeal Process
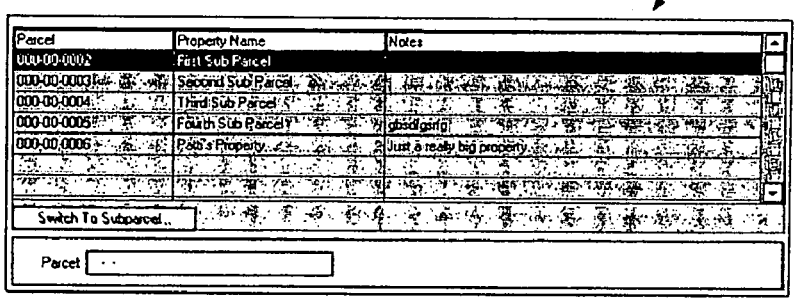
FIG. 11 Subparcels

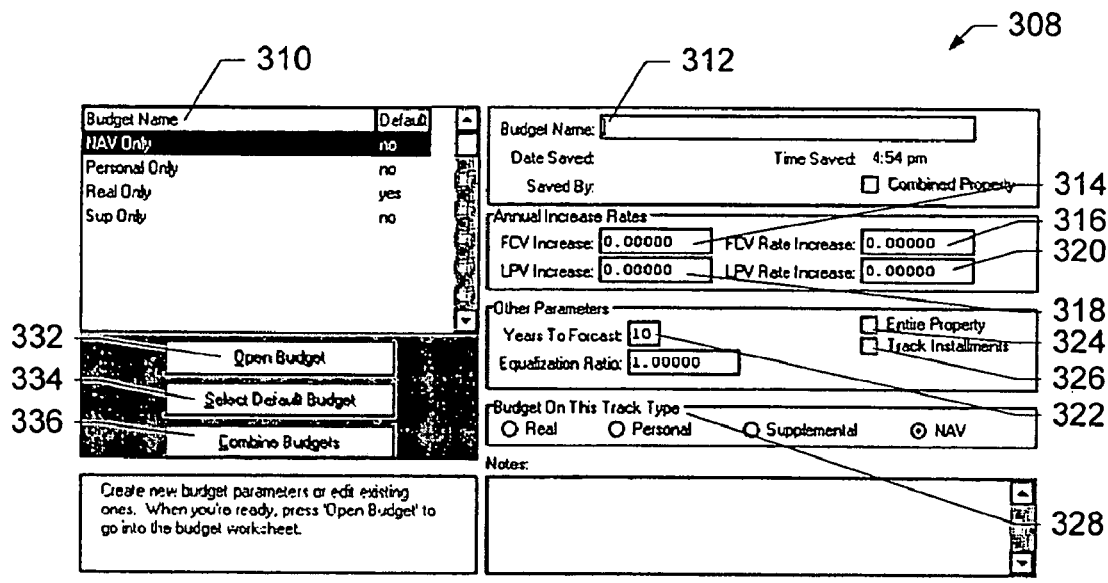
FIG. 12 Create Budgets
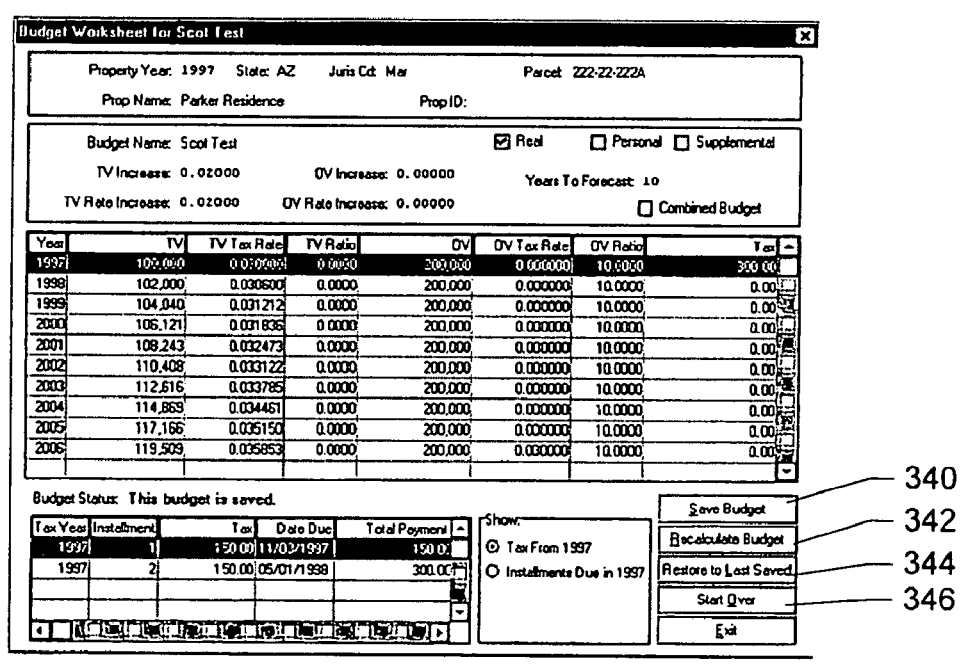
FIG. 13 Budget Worksheet

FIG. 14 Accounts Payable

FIG. 15 Auto Add

FIG. 16 Address Information

FIG. 17 Contacts

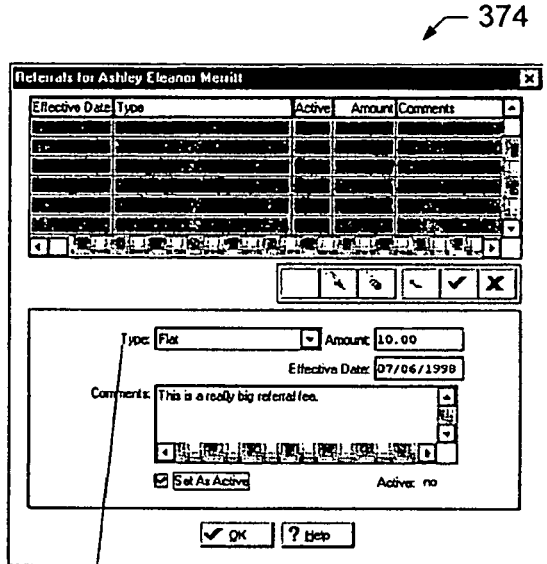
FIG. 18 Referral
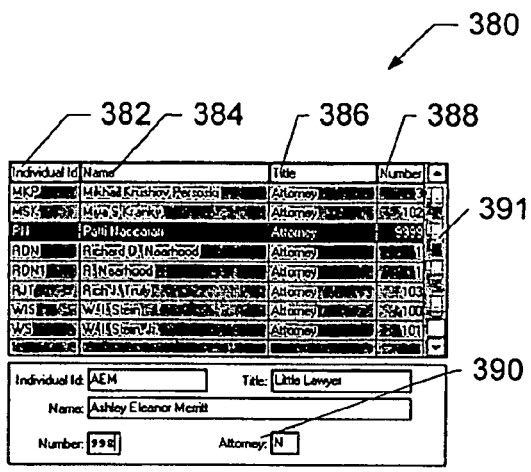
FIG. 19 Working Professionals
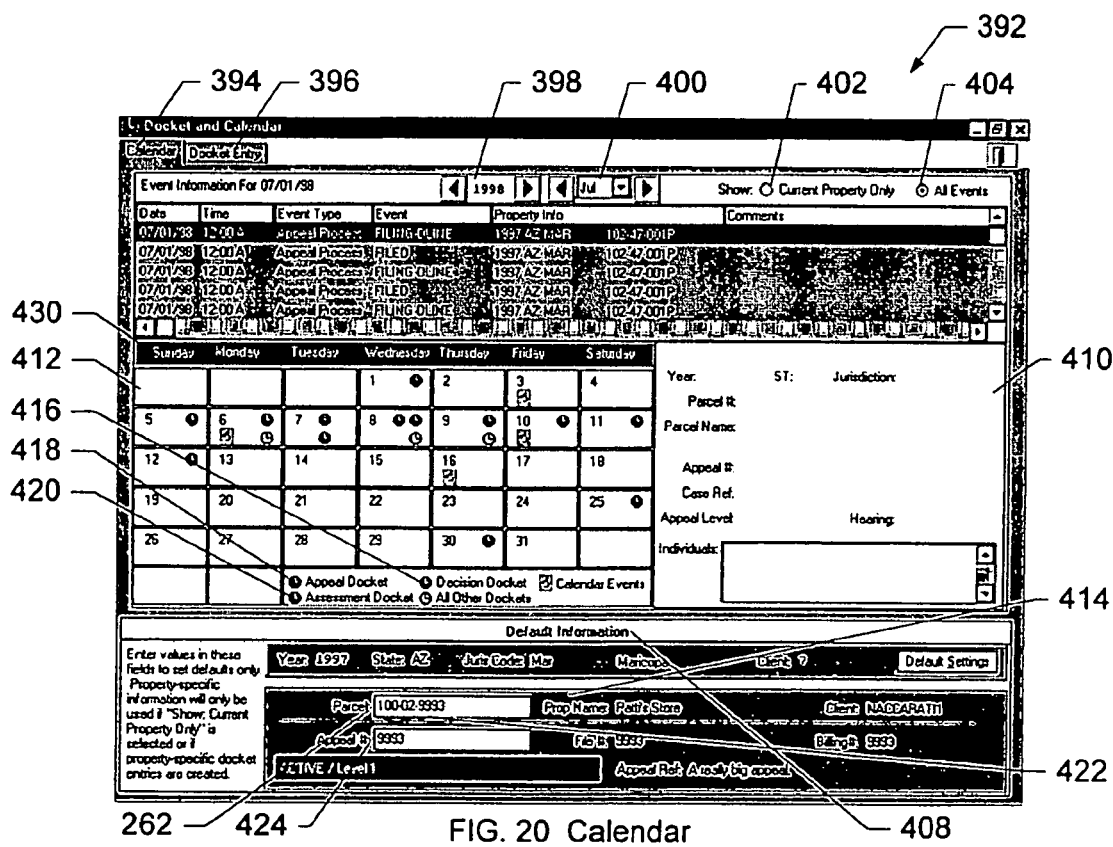
FIG. 20 Calendar

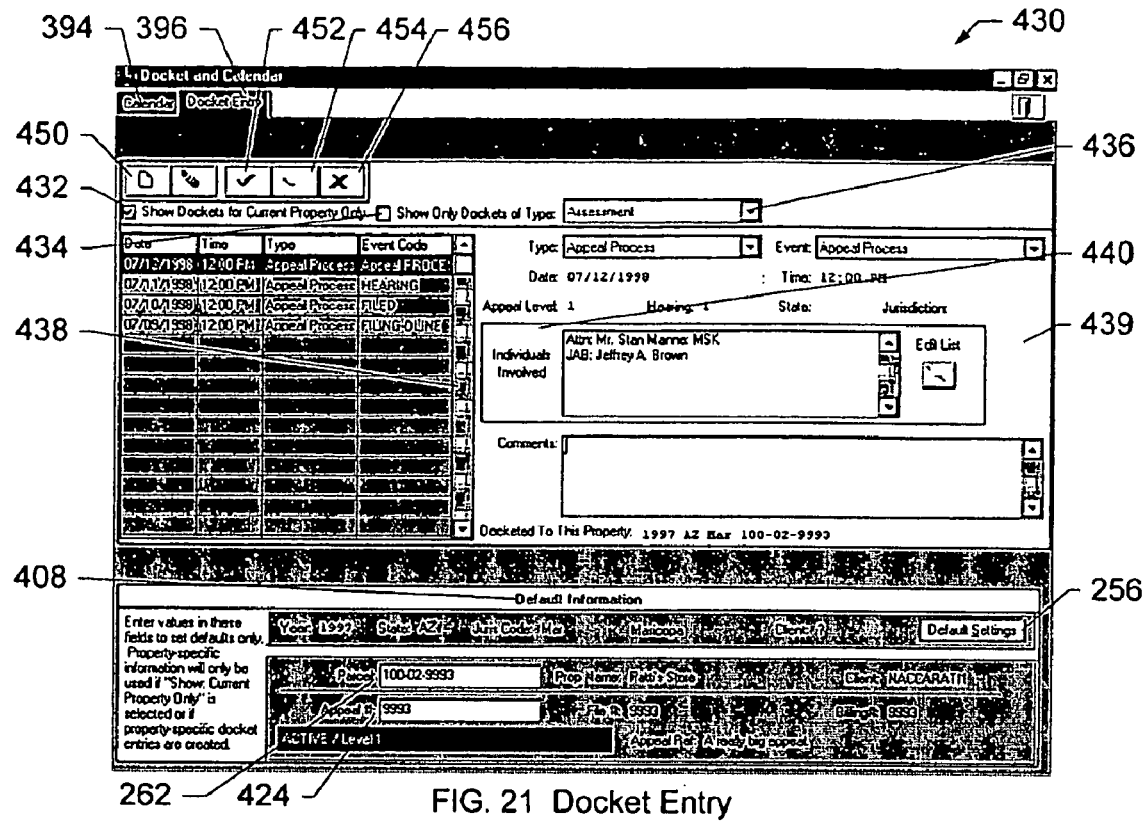
FIG. 21 Docket Entry
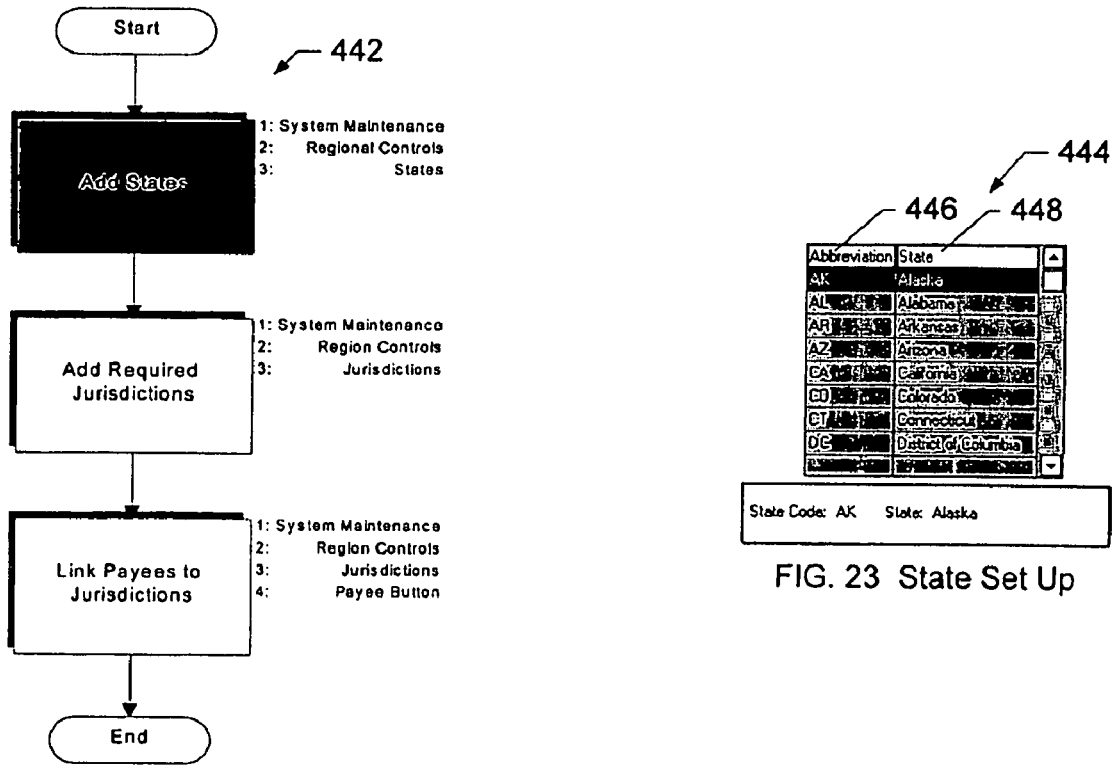
FIG. 22 Creating States and Jurisdictions
FIG. 23 State Set Up

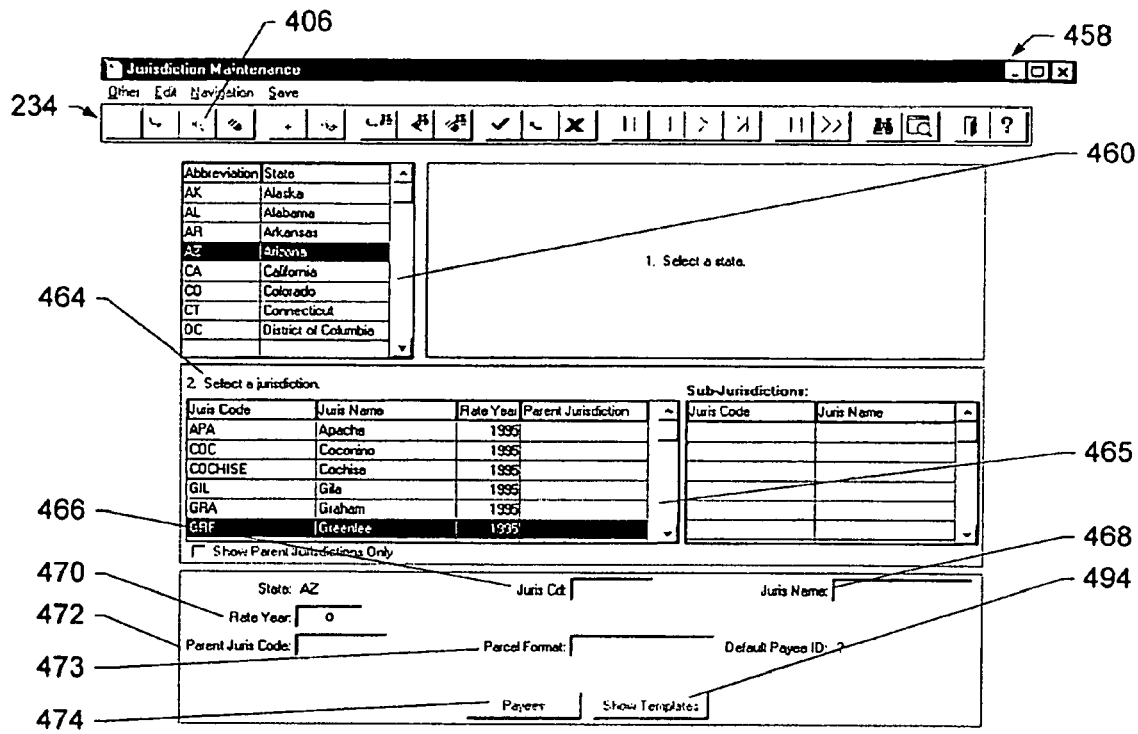
FIG. 24 Jurisdiction Set Up
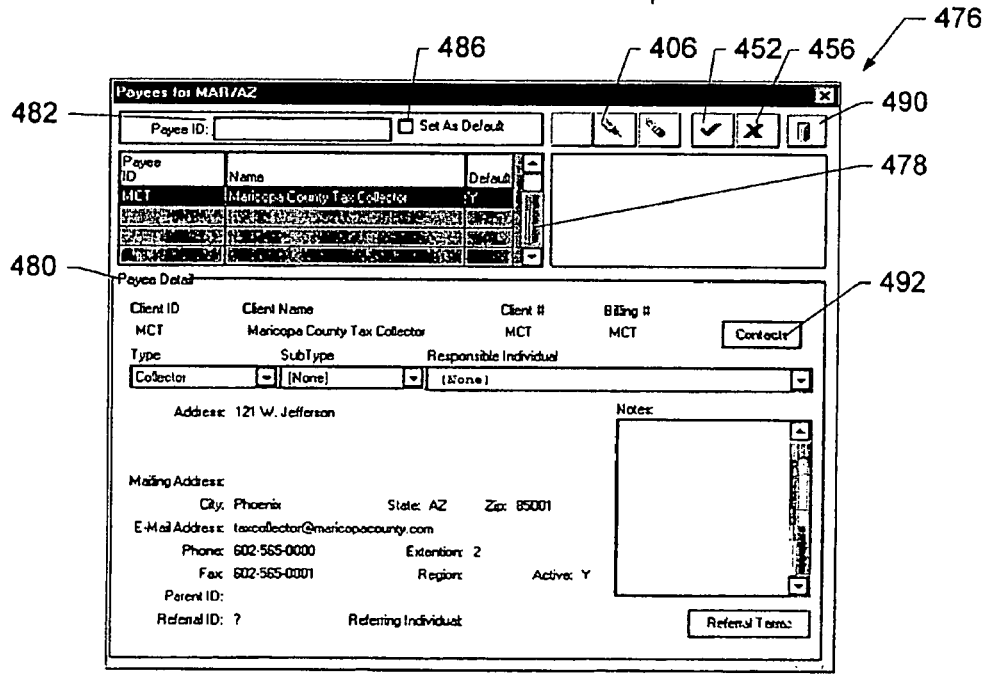
FIG. 25 Jurisdiction Payee

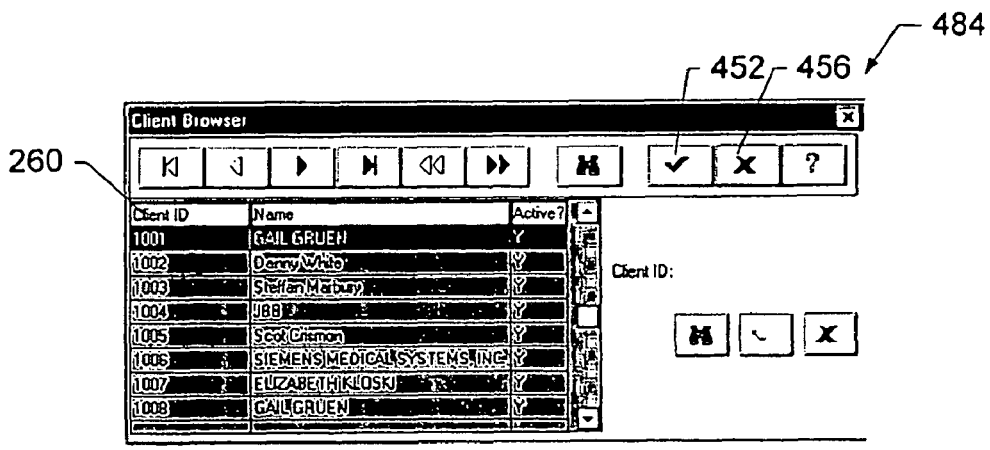
FIG. 26 Client Browser
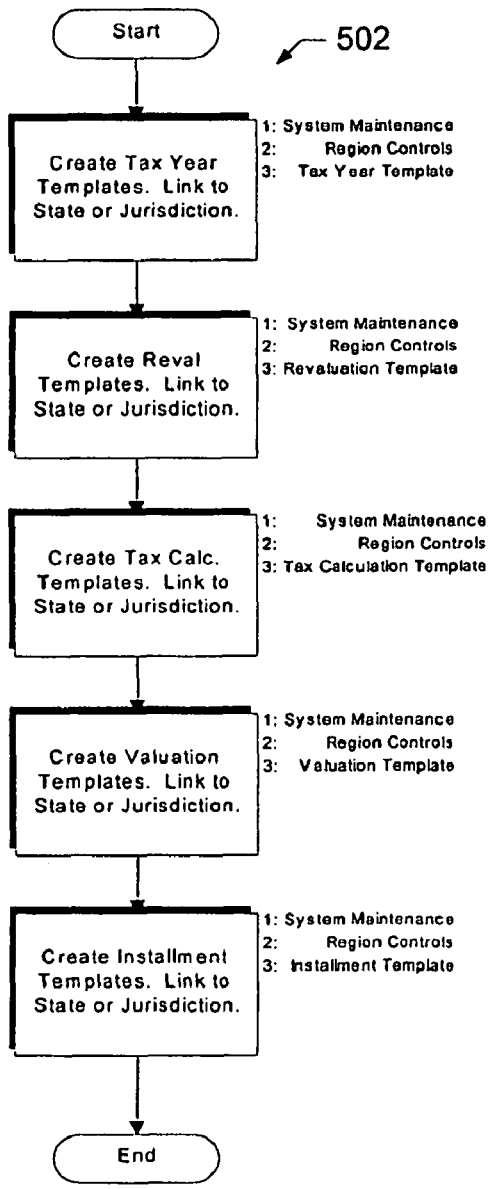
FIG. 27 Templates

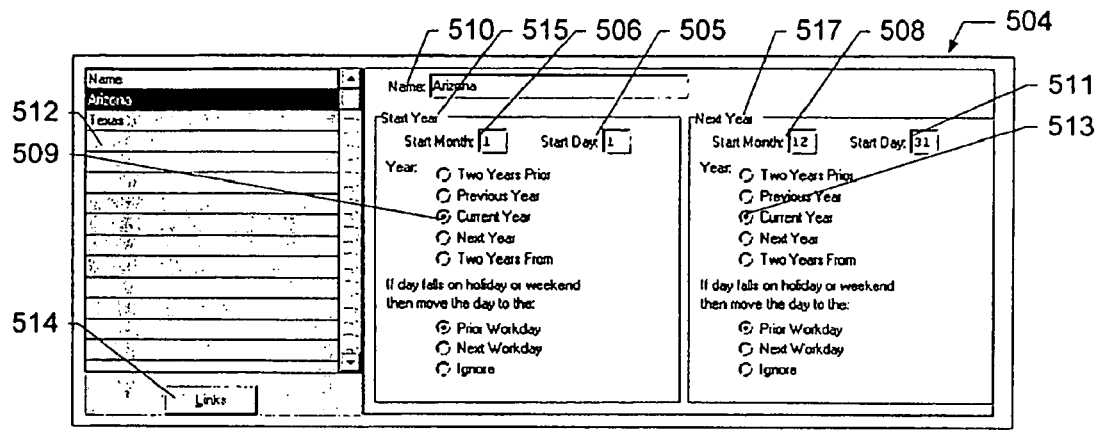
FIG. 28 - TAX YEAR TEMPLATE
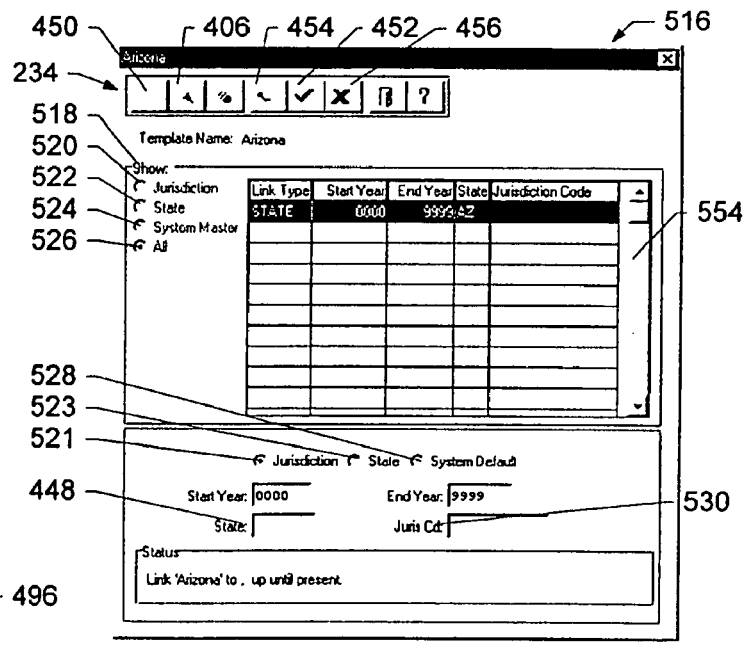
FIG. 29 Tax Year Template Link To
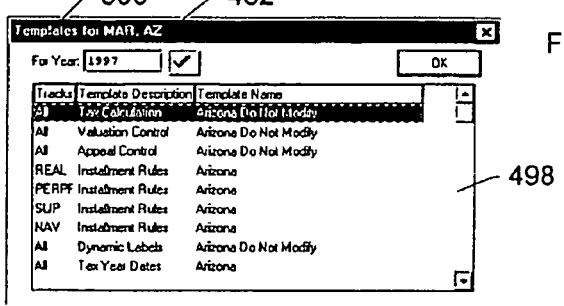
FIG. 30 Templates by Year

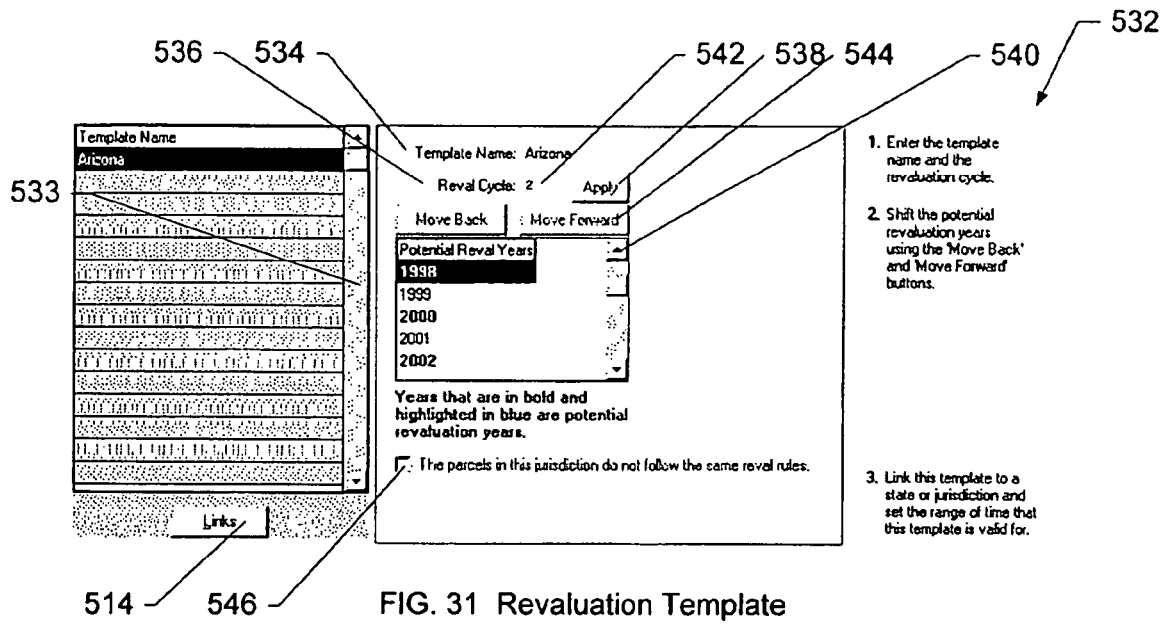
FIG. 31 Revaluation Template
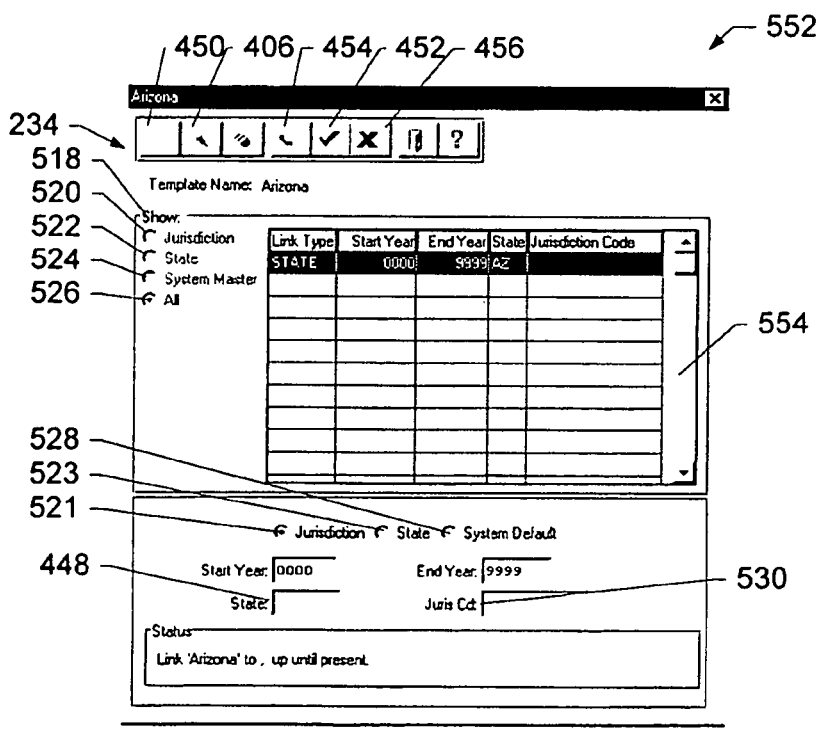
FIG. 32 Template Link To

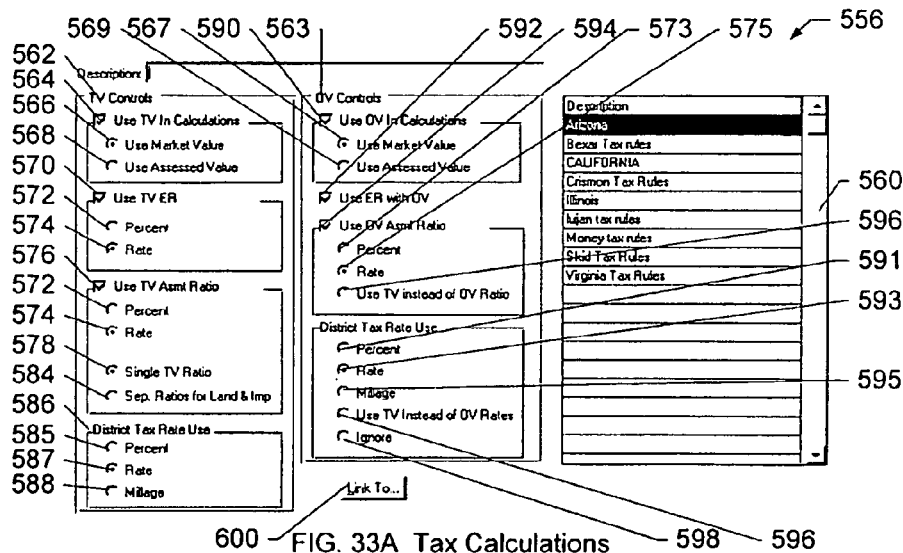
FIG. 33A Tax Calculations
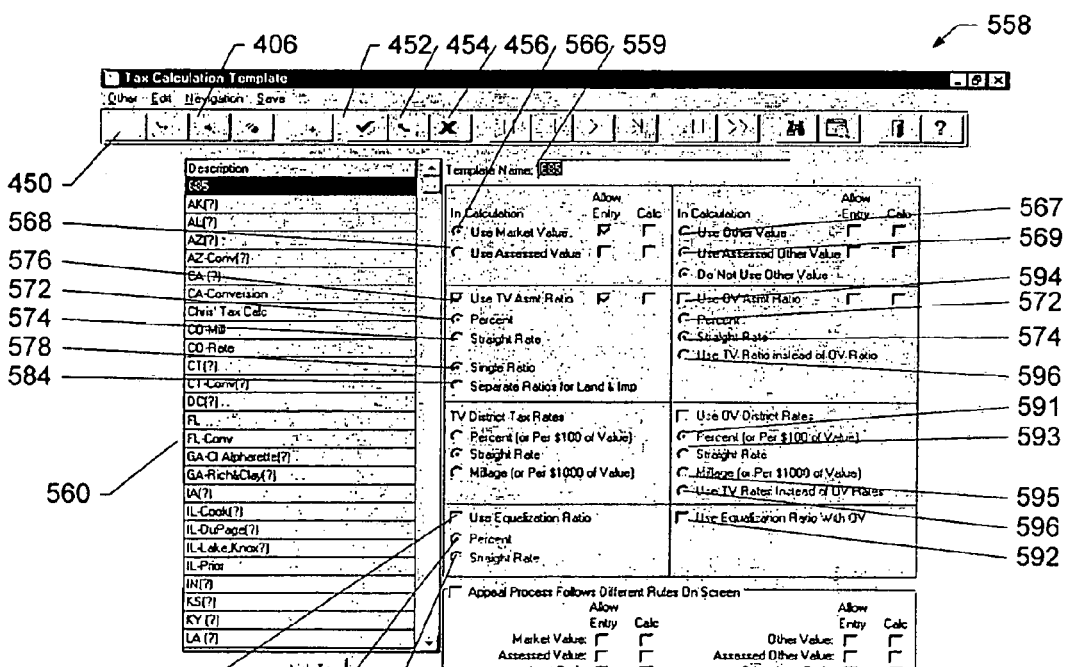
FIG. 33B Tax Calculations

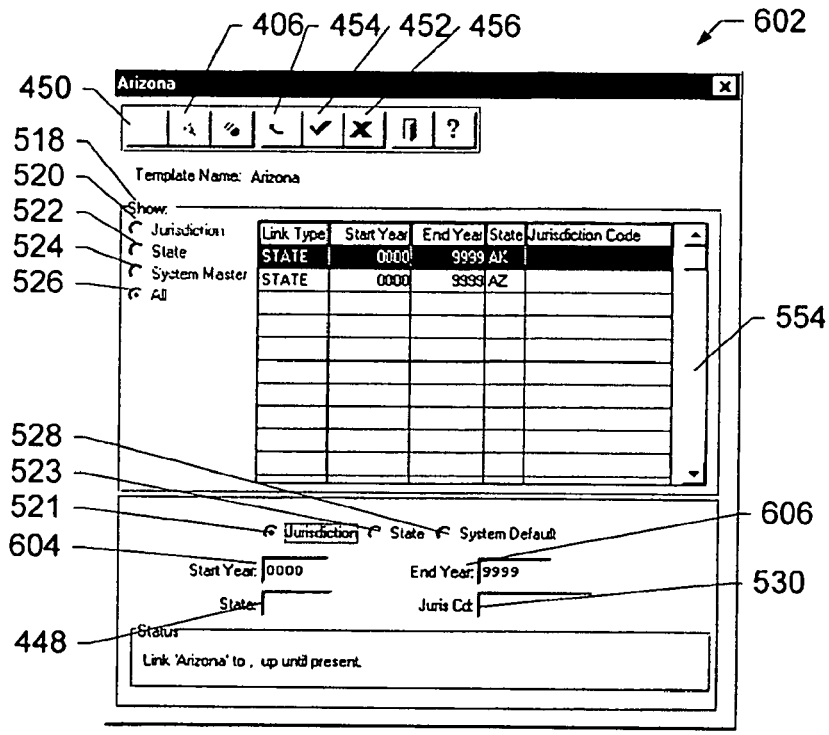
FIG. 34 Tax Calculation Link To
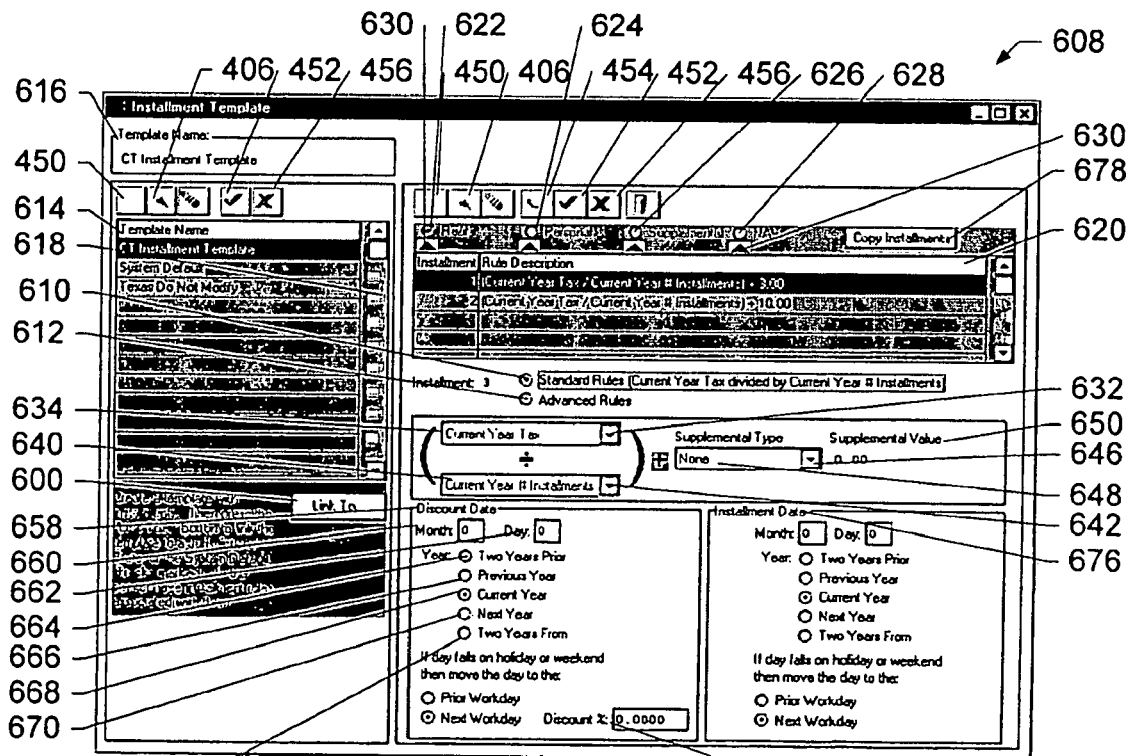
FIG. 35 Installment Template

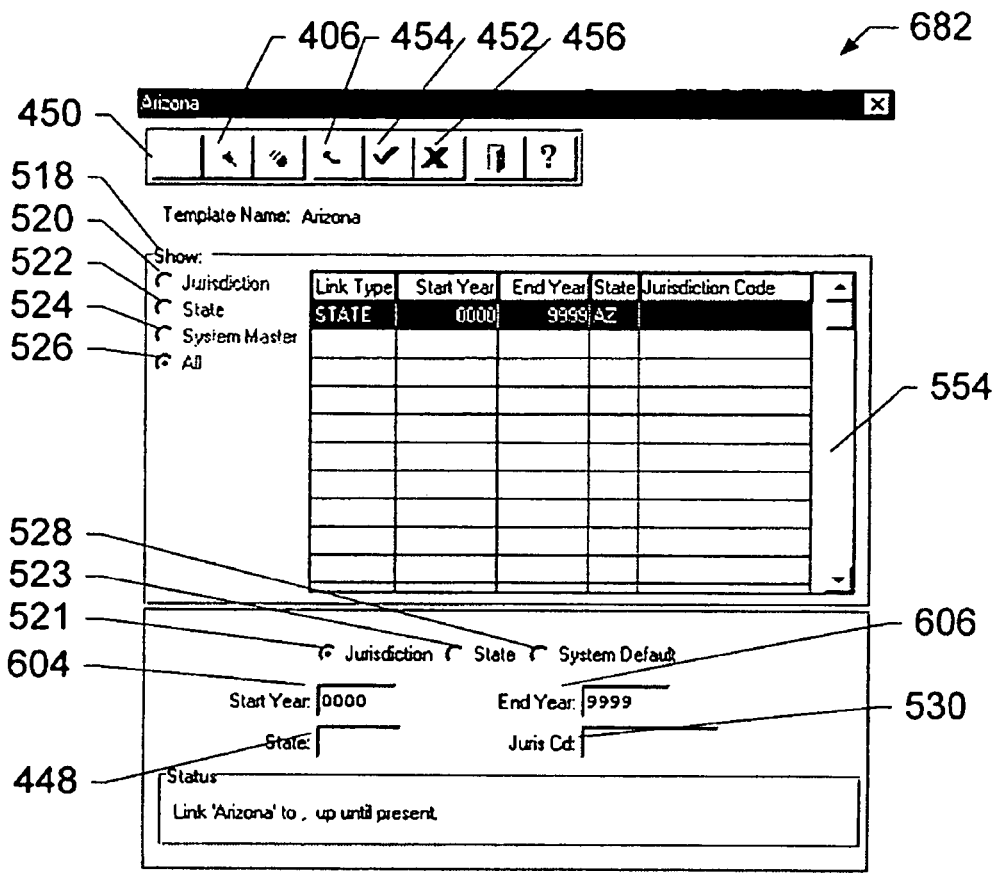
FIG. 36 Installment Templates Link To
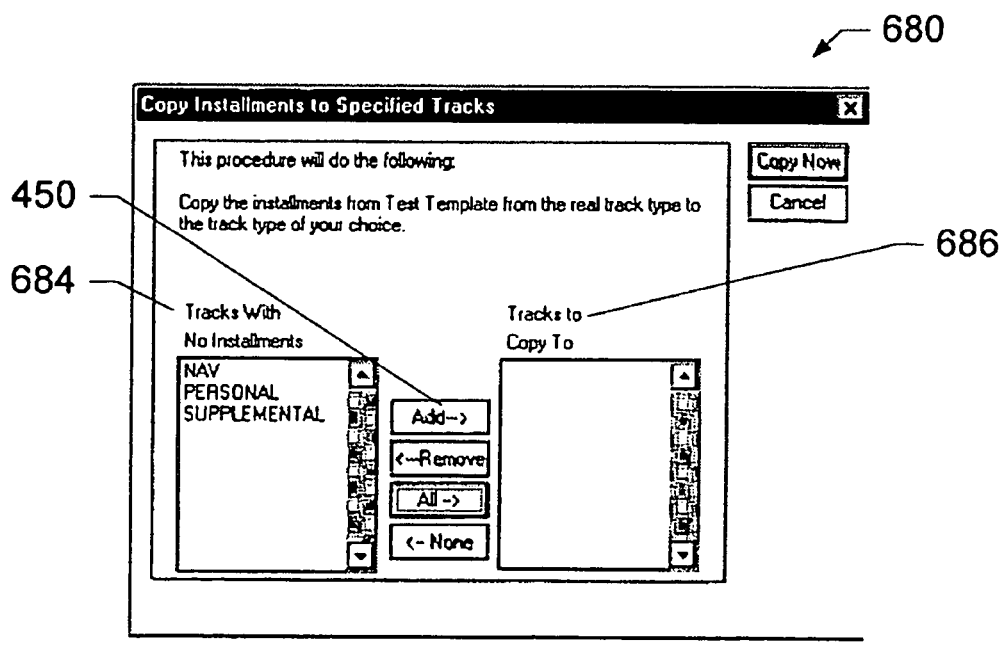
FIG. 37 Copy Installments Dialog Box

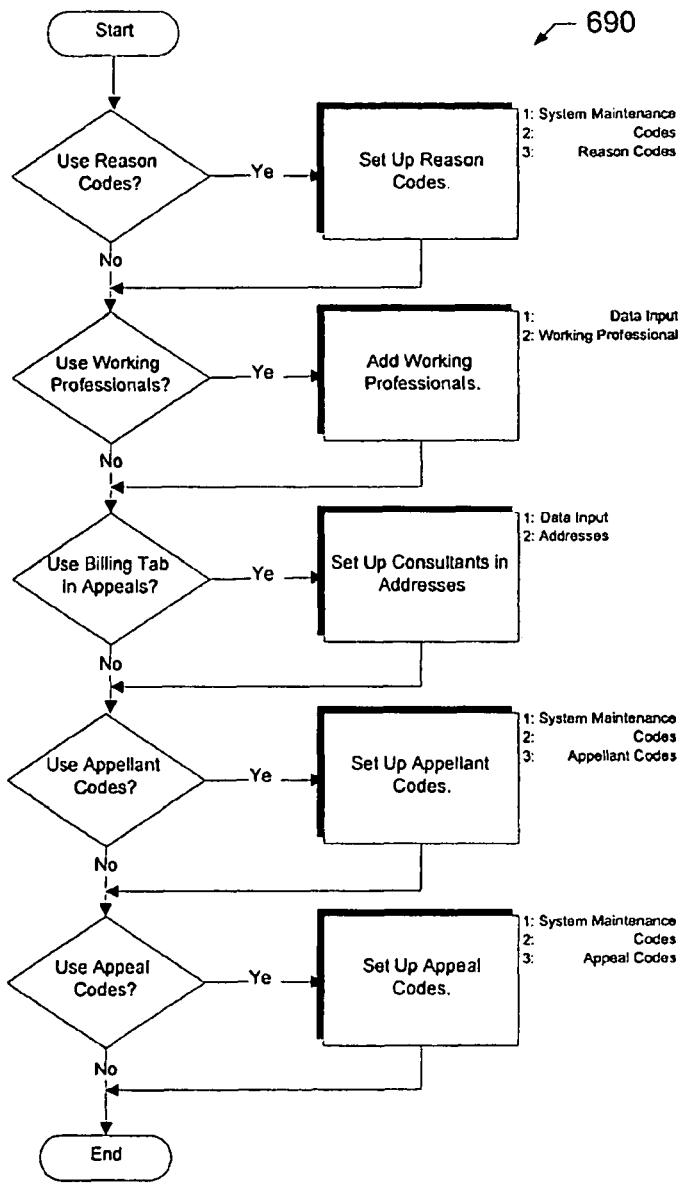
FIG. 38 Appeals Set Up
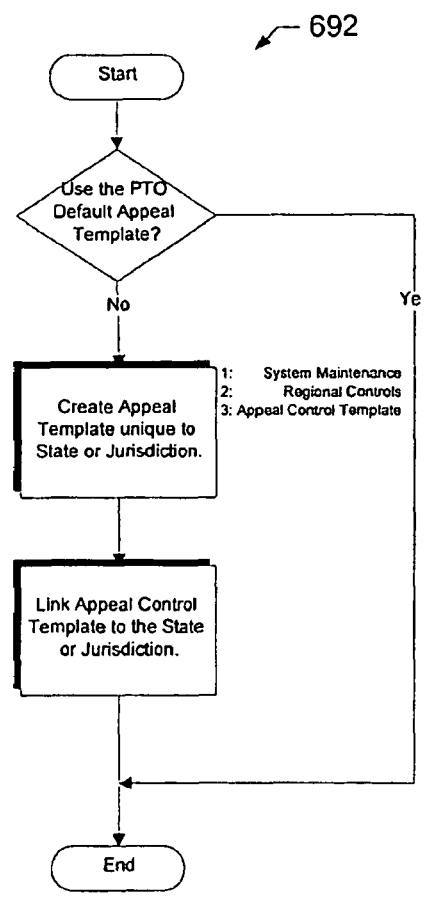
FIG. 39 Appeal Control

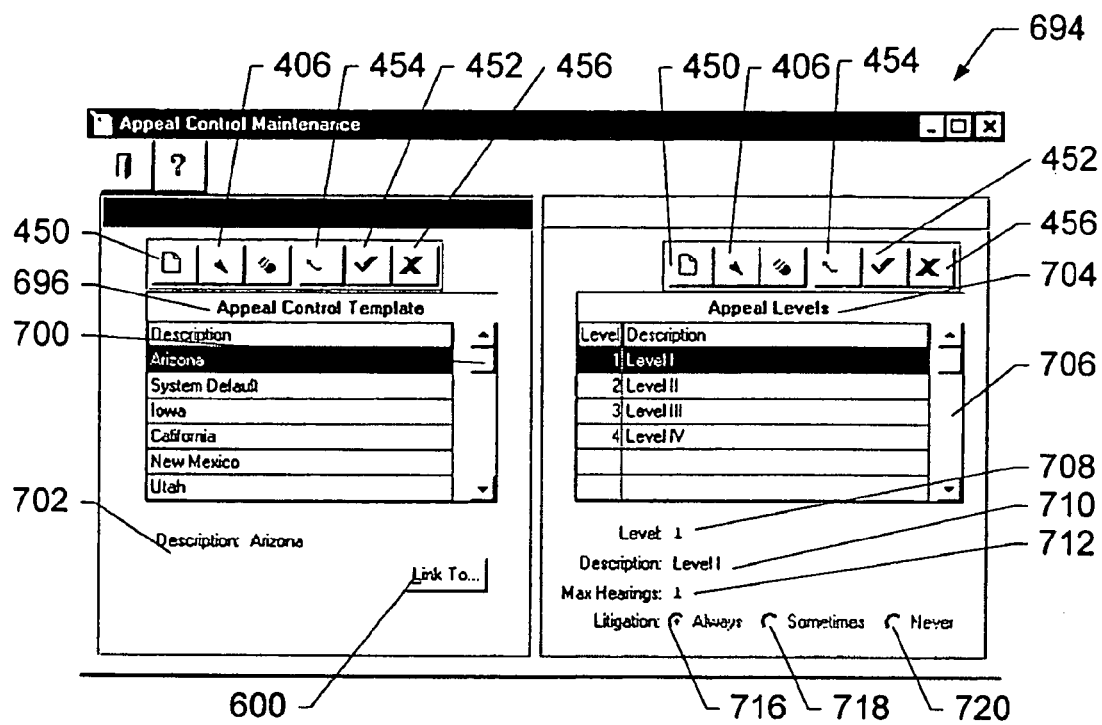
FIG. 40 Appeal Control
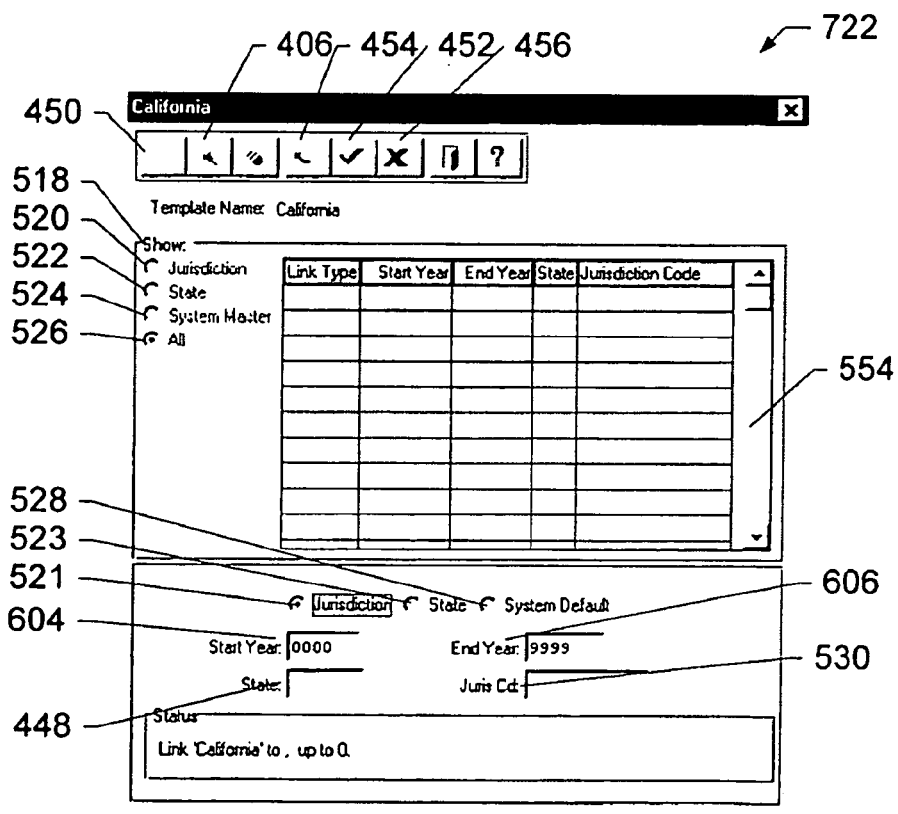
FIG. 41 Appeal Control Link

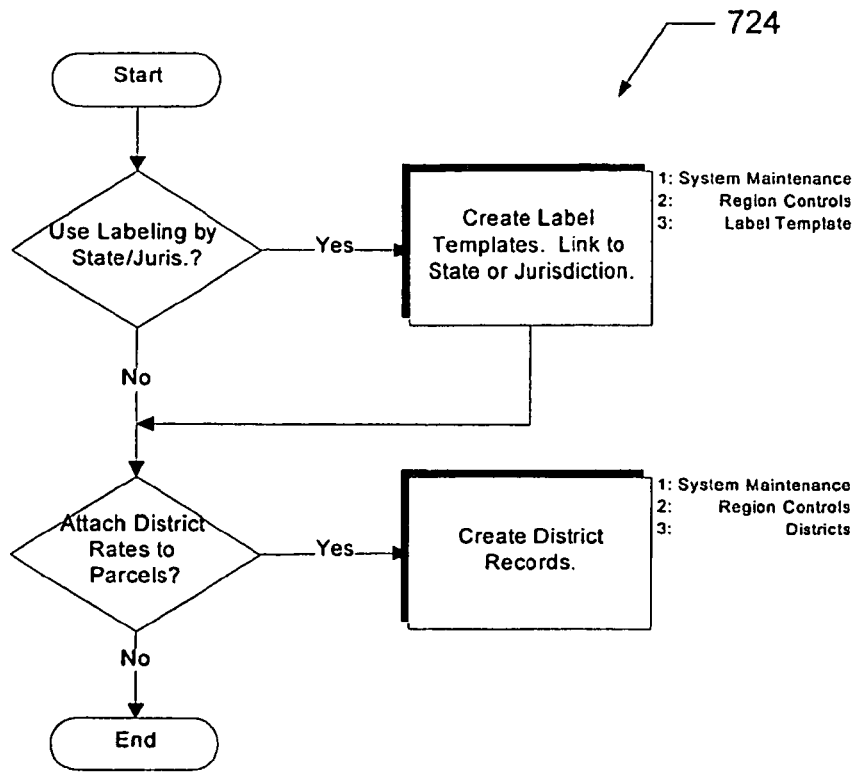
FIG. 42 Dynamic Labeling and Districts
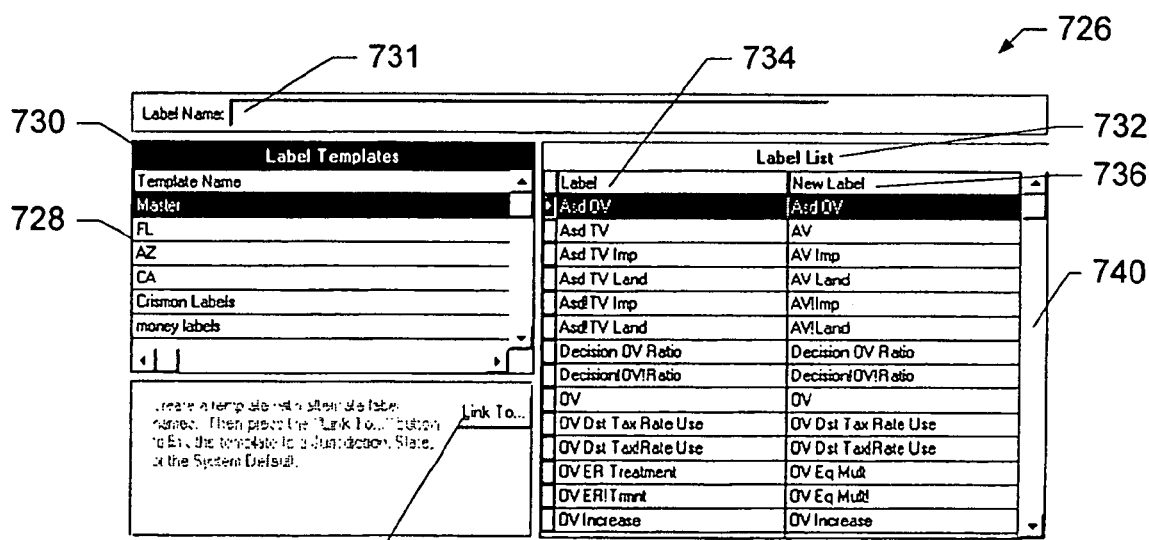
FIG. 43A Label Template

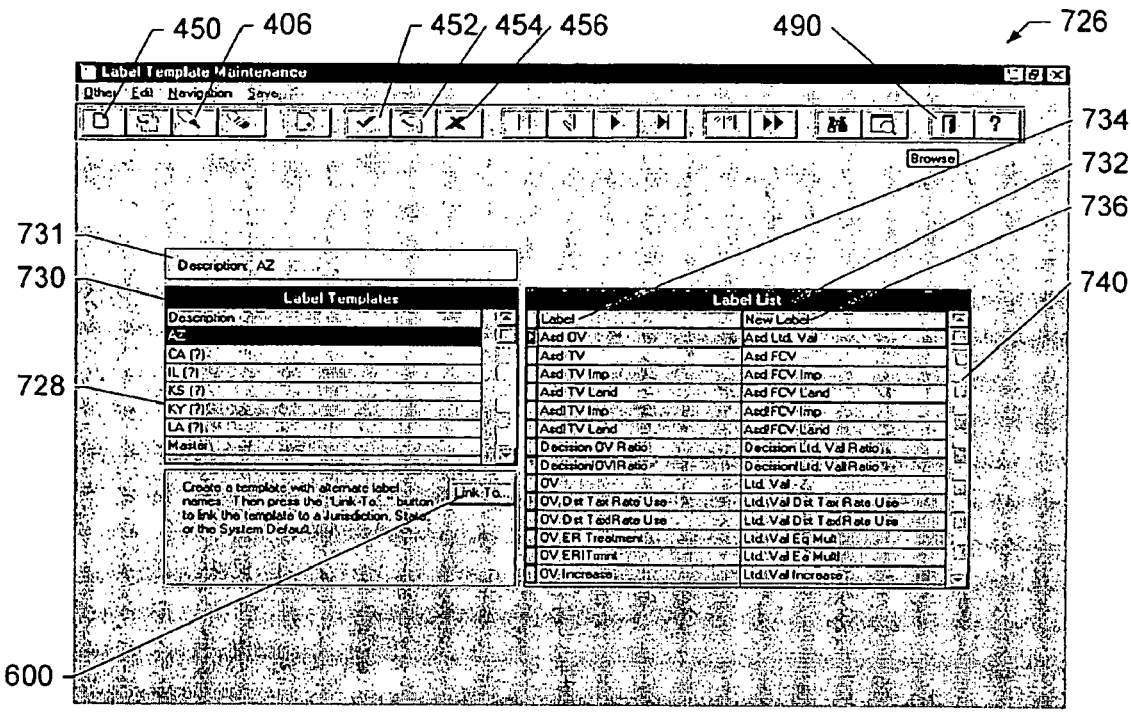
FIG. 43B Label Template
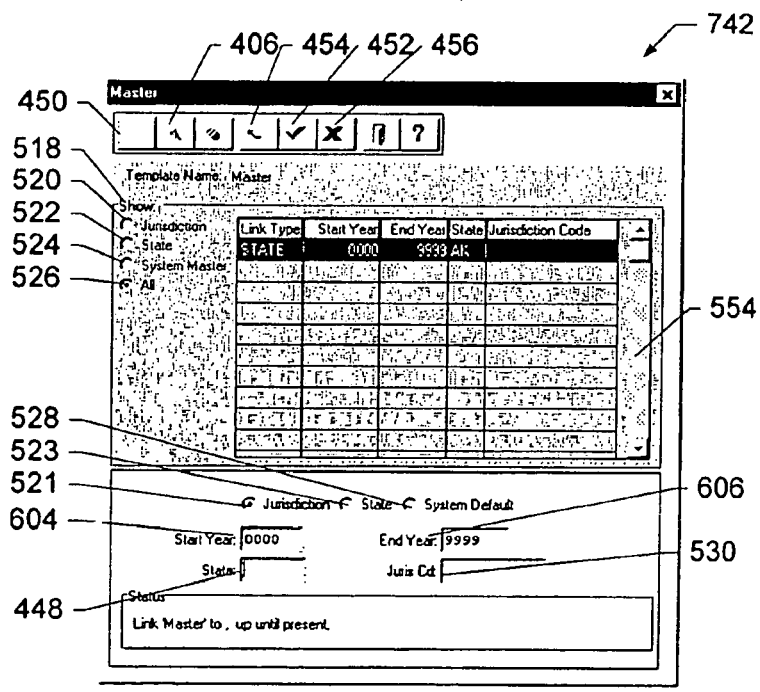
FIG. 44 Label Template Link To

| Dist Code | Classification | TV Rate | OV Rate |
|---|---|---|---|
| 011300 | 5 | 0.049993 | 0.131873 |
| 011301 | 5 | 0.049993 | 0.131873 |
| 011303 | 7 | 0.049993 | 0.131873 |
| 021300 | 5 | 0.033276 | 0.095237 |
| 031300 | 5 | 0.037463 | 0.105936 |
| 031600 | 8 | 0.037028 | 0.102171 |
| 031602 | | 0.037028 | 0.102171 |
| 051300 | | 0.047124 | 0.143199 |
| 061300 | | 0.038875 | 0.097567 |

FIG. 45 - District Set Up

METHOD AND SYSTEM FOR MANAGING MULTI-JURISDICTIONAL PROPERTY TAX INFORMATION

RELATED APPLICATIONS

This application is a continuation of U.S. Nonprovisional application Ser. No. 09/812,305 filed Mar. 19, 2001 (now U.S. Pat. No. 7,249,072), which claims the benefit of U.S. Provisional Application No. 60/190,154, filed Mar. 17, 2000, entitled "Method and System for Managing Multi-Jurisdictional Property Tax Information," which is incorporated herein by reference.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever in such included copyrighted materials.

BACKGROUND

This invention relates generally to the management of property tax information. More particularly, it relates to a method and system for managing multi jurisdictional property tax information.

Competitive forces in the real estate industry have caused real estate companies to continuously demand more information and better performance from their property tax managers. More than $200 billion in property taxes are collected each year in the United States, outpacing corporate income taxes in some corporations. Increases in property taxes to plug the state and local revenue holes left by reduced federal funding have created cost pressures on many companies. With over 80,000 state and local taxing jurisdictions, managing multi jurisdictional property tax information can be a daunting task.

Property tax managers have responded to these challenges by turning to computer information systems for solutions that improve productivity and aid in reducing property tax costs. Before the present invention, however, such systems have not been able to efficiently manage multi jurisdictional property tax information.

Therefore, there exists a need in the art for a method and system for managing multi jurisdictional property tax information. Accordingly, it is an object of this invention to provide such an improved method and system.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided a method for managing multi jurisdictional property tax information for a plurality of real estate parcels. A computer system in accordance with the invention includes a data storage device, an output device and a processor. The processor is programmed to maintain in the storage device a database of property tax data including a plurality of parcel records, each parcel record including a parcel identifier for identifying a parcel of the plurality of real estate parcels, a tax year identifier for identifying the tax year applicable to the parcel, a state identifier for identifying the state in which the parcel is located and a jurisdiction identifier for identifying a jurisdiction within the state in which the parcel is located. The processor is further programmed to maintain in the storage device a plurality of templates wherein each template is associated with a tax assessing or billing entity, defines tax rules specific to the associated entity and is linked to at least one of a state record for the state in which the parcel is located, a jurisdiction record for a jurisdiction within the state or a system master record. The processor is further programmed to receive an input requesting a report of information for a specified parcel record, to retrieve a template from the stored templates based on the tax year identifier, the state identifier and the jurisdiction identifier linked to the retrieved template, to generate the requested report using the retrieved template and the tax rules defined by the retrieved template, and to output the requested report to the output device.

In a preferred embodiment of the system, the plurality of templates includes one or more of a tax calculation template for calculating property taxes for the parcel, a valuation template for defining data entry rules applicable to a parcel, an appeals template for defining property tax appeal information, an installment template for defining installment payment rules applicable to the parcel, a revaluation template for defining a revaluation cycle for the parcel, a tax year template for defining the beginning and end dates of a tax year and a dynamic label template for defining naming conventions for a state or jurisdiction to allow for the use of different state and/or jurisdiction terminology. The processor is programmed to automatically retrieve a template by searching the stored templates for a template having a link that matches the first of: a tax year applicable to the selected parcel, the state in which the selected parcel is located, and the jurisdiction associated with the specified parcel; or a tax year applicable to the selected parcel and the state in which the selected parcel is located; or a tax year applicable to the selected parcel.

A preferred method in accordance with the invention, includes maintain in a computer storage device a database of property tax data including a plurality of parcel records, wherein each parcel record includes a parcel identifier for each parcel of the plurality of real estate parcels, a tax year identifier for identifying the tax year applicable to each parcel, a state identifier for identifying the state in which each parcel is located and a jurisdiction identifier for identifying a jurisdiction within the state in which the parcel is located. The method further includes maintaining in the storage device a plurality of templates wherein each template is associated with a tax assessing or billing entity, defines tax rules specific to the associated entity and is linked to at least one of a state record for the state in which the parcel is located, a jurisdiction record for a jurisdiction within the state or a system master record. The method can include receiving an input requesting a report of information for a specified parcel record, to retrieve a template from the stored templates based on the tax year identifier, the state identifier and the jurisdiction identifier linked to the retrieved template. The method can further include generating the requested report using the retrieved template and the tax rules defined by the retrieved template and outputting the requested report to the output device.

The step of maintaining a plurality of templates can include maintaining one or more of a tax calculation template for calculating property taxes for the parcel, a valuation template for defining data entry rules applicable to a parcel, an appeals template for defining property tax appeal information, an installment template for defining installment payment rules applicable to the parcel, a revaluation template for defining a revaluation cycle for the parcel, a tax year template for defining the beginning and end dates of a tax year and a dynamic label template for defining naming conventions for a state or jurisdiction to allow for the use of different state and/or jurisdiction terminology. The step of retrieving a template from the stored templates can include automatically searching the stored templates for a template having a link that matches the first of: a tax year applicable to the selected parcel, the state in which the selected parcel is located, and the jurisdiction associated with the specified parcel; or a tax year applicable to the selected parcel and the state in which the selected parcel is located; or a tax year applicable to the selected parcel.

Using the system and method of the present invention, property tax data for properties covered by different jurisdictions can be efficiently defined and accessed at the jurisdictional level at the lowest-level tax collecting entity.

BRIEF DESCRIPTION OF THE DRAWINGS

The accompanying drawings, which are incorporated in and constitute a part of the specification, illustrate the presently preferred embodiments and methods of the invention and, together with the general description given above and the detailed description of the preferred embodiments and methods given below, serve to explain the principles of the invention.

FIG. 2A shows a block diagram of the various software program components of one embodiment of a property tax application in accordance with the invention.

FIG. 2B shows a computer monitor display of an exemplary Main window for accessing the various software program components of the property tax application.

FIG. 4 shows a computer monitor display of an exemplary Property Maintenance window for adding, updating and deleting data in a main parcel record.

FIG. 5 shows a computer monitor display of an exemplary Tax Calculation dialog box for selecting taxing jurisdictions to use to calculate tax for a parcel.

FIG. 6 shows a computer monitor display of an exemplary Assessment window for adding, updating and deleting assessment tracks and related detail.

FIG. 7 shows a computer monitor display of an exemplary Districts dialog box for displaying a listing of all assessment tracks for a property.

FIG. 8 shows a computer monitor display of an exemplary Appeal Record tab window for entering information into the system regarding appeals and billings for a parcel record.

FIG. 9 shows a computer monitor display of an exemplary Appeal Billing tab window for setting up billing information for an appeal FIG. 10 shows a computer monitor display of an exemplary Appeal Process window that can be used to input decision data on specific appeals.

FIG. 11 shows a computer monitor display of an exemplary Subparcels dialog box for adding to or deleting subparcels from a lead or parent parcel.

FIG. 12 shows a computer monitor display of an exemplary Create Budgets window for accessing the budgeting function of the system.

FIG. 13 shows a computer monitor display of an exemplary Budget Worksheet window that displays a budget generated by using the Create Budgets window of FIG. 12.

FIG. 14 shows a computer monitor display of an exemplary Accounts Payable window for accessing the accounts payable function of the system.

FIG. 15 shows a computer monitor display of an exemplary Auto Add dialog box for setting the system to automatically calculate tax installments and create accounts payable records for the installments.

FIG. 16 shows a computer monitor display of an exemplary Address Information window for entering and maintaining in the system address records for clients, payees, taxing jurisdictions and the like.

FIG. 17 shows a computer monitor display of an exemplary Contacts dialog box for attaching additional contacts to an address record.

FIG. 18 shows a computer monitor display of an exemplary Referral dialog box for attaching referral information to a client address record.

FIG. 19 shows a computer monitor display of an exemplary Working Professionals window for defining the people in the user's organization that may take a lead or supportive role in working with specific appeal cases.

FIG. 20 shows a computer monitor display of a Calendar tab of an exemplary Docket and Calendar window for accessing the calendar functions of the system.

FIG. 21 shows a computer monitor display of a Docket Entry tab of an exemplary Docket and Calendar window for accessing the calendar functions of the system.

FIG. 22 is a flow diagram showing the process by which state and jurisdiction information is added to the database of the property tax system.

FIG. 23 shows a computer monitor display of an exemplary State Set Up window for adding a new state to the database of the system.

FIG. 24 shows a monitor display of the Jurisdiction Maintenance window for adding and modifying states and jurisdictions stored in the database of the property tax system.

FIG. 25 shows a monitor display of a Jurisdiction Payee window for attaching a payee to a jurisdiction stored in the database of the property tax system.

FIG. 26 shows a monitor display of a browser like that can be used to select information from the database to be and enter into input fields used in the application.

FIG. 27 is a flow diagram showing the process by which Tax Year Templates, Revaluation Templates, Tax Calculation Templates, Valuation Templates and Installment Templates are created and stored in the database of the property tax system.

FIG. 28 shows a monitor display of a Tax Year Template window for creating a Tax Year Template.

FIG. 29 shows a monitor display of a window for linking a Tax Year Template to a state, jurisdiction or a system master record.

FIG. 30 shows a monitor display of a window for displaying templates linked to a sample jurisdiction.

FIG. 31 shows a monitor display of a Revaluation Template window for creating a Revaluation Template.

FIG. 32 shows a monitor display of a window for linking a Revaluation Template to a state, jurisdiction or a system master record.

FIG. 33A shows a monitor display of a Tax Calculation Template window for creating a Tax Calculation Template.

FIG. 33B shows a monitor display of an alternative configuration of a Tax Calculation Template window for creating a Tax Calculation Template.

FIG. 34 shows a monitor display of a window for linking a Tax Calculation Template to a state, jurisdiction or a system master record.

FIG. 35 shows a monitor display of an Installment Template window for creating an Installment Template.

FIG. 36 shows a monitor display of a window for linking an Installment Template to a state, jurisdiction or a system master record.

FIG. 37 shows a monitor display of a Copy Installments window for recreating one assessment track's installment rules for another assessment track.

FIG. 38 is a flow diagram showing the process by which appeals are set up before creating an appeal record.

FIG. 39 is a flow diagram showing the process by which Appeal Control Templates are created and stored in the database of the property tax system.

FIG. 40 shows a monitor display of an Appeal Control Template window for creating an Appeal Control Template.

FIG. 41 shows a monitor display of a window for linking an Appeal Control Template to a state, jurisdiction or a system master record.

FIG. 42 is a flow diagram showing the process by which Label Templates are created and stored in the database of the property tax system and by which specific taxing districts and their rates are set up in the property tax system.

FIG. 43A shows a monitor display of a Label Template window for creating a Label Template.

FIG. 43B shows a monitor display of an alternative Label Template window for creating a Label Template.

FIG. 44 shows a monitor display of a window for linking a Label Template to a state, jurisdiction or a system master record.

FIG. 45 shows a monitor display of a Districts Set Up window for attaching taxing districts to a jurisdiction stored in the database of the property tax system.

DESCRIPTION

Reference will now be made in more detail to the presently preferred embodiments and methods of the invention as illustrated in the accompanying drawings, in which like numerals refer to like parts throughout the several views.

Figure 1:
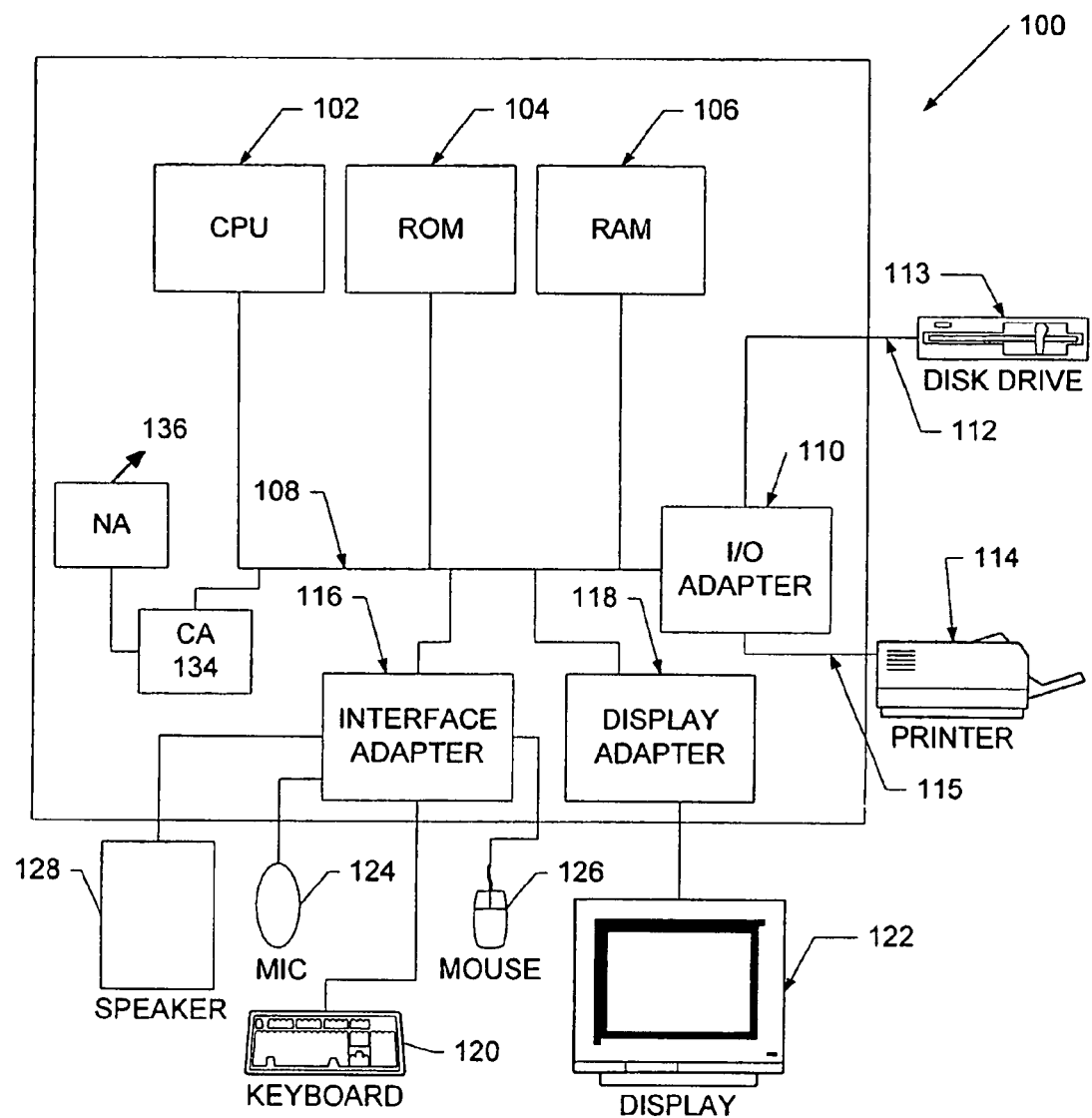
FIG. 1 is a block schematic diagram of a typical computer system, such as a personal computer system, with which the method and system of the present invention can be practiced.

FIG. 1 depicts a representative a typical hardware configuration of a computer system 100 that can be utilized to practice the subject invention. The computer 100 is controlled by a central processing unit 102, which may be a conventional microprocessor. A number of other units, all interconnected via a system bus 108, are provided to accomplish specific tasks. Although a particular computer may only have some of the units illustrated in FIG. 1, or may have additional components not shown, most computers will include at least the units shown. Specifically, the computer system 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk drive unit 113 and printer 114 to the bus 108, via cables 112 and 115, respectively. A user interface adapter 116 is also provided for connecting input devices, such as a keyboard 120, and other known interface devices including a microphone 124, a mouse 126 and a speaker 128, to the bus 108. A display device 122, such as a video monitor, is connected via a display adapter 118 to bus 108 and provides visual output to the user. A communications adapter 134, connected to bus 108, provides access to a network 136. The computer 100 has resident thereon and its basic operations are controlled and coordinated by an operating system, as is well-known in the art.

FIG. 2A is a diagram showing the software program components of one embodiment of a property tax application that implements the logic and user interface of the property tax information system of the invention. The property tax application includes a Data Input program 200, a Docket/Calendar program 202, a Reports program 204, a System Maintenance program 206 and a relational database management system 208 (RDBMS) for managing a database 210. Data entered into the system is stored in the database 210 in tables.

FIG. 2B shows a computer monitor display of an exemplary Main window 201 for accessing the various software program components of the property tax application.

The Data Input program 200 provides the means for creating and maintaining multi jurisdictional property tax information in the database 210, including property records, assessment values, taxing districts (within jurisdictions and states), tax appeal information, appeal decisions (appeal process), sub-parcel information, budgets for forecasting tax obligations, important addresses (such as for clients, assessors and others), and working professional (employee related) information. The Docket/Calendar program 202 provides the means to set up and define docketing requirements and to view, enter and delete docket information. The Reports program 204 generates reports of the data stored in the database 210 to output information from the database 210. The System Maintenance program 206 stores tables in the database 210 for setting up the property tax application.

Figure 3:
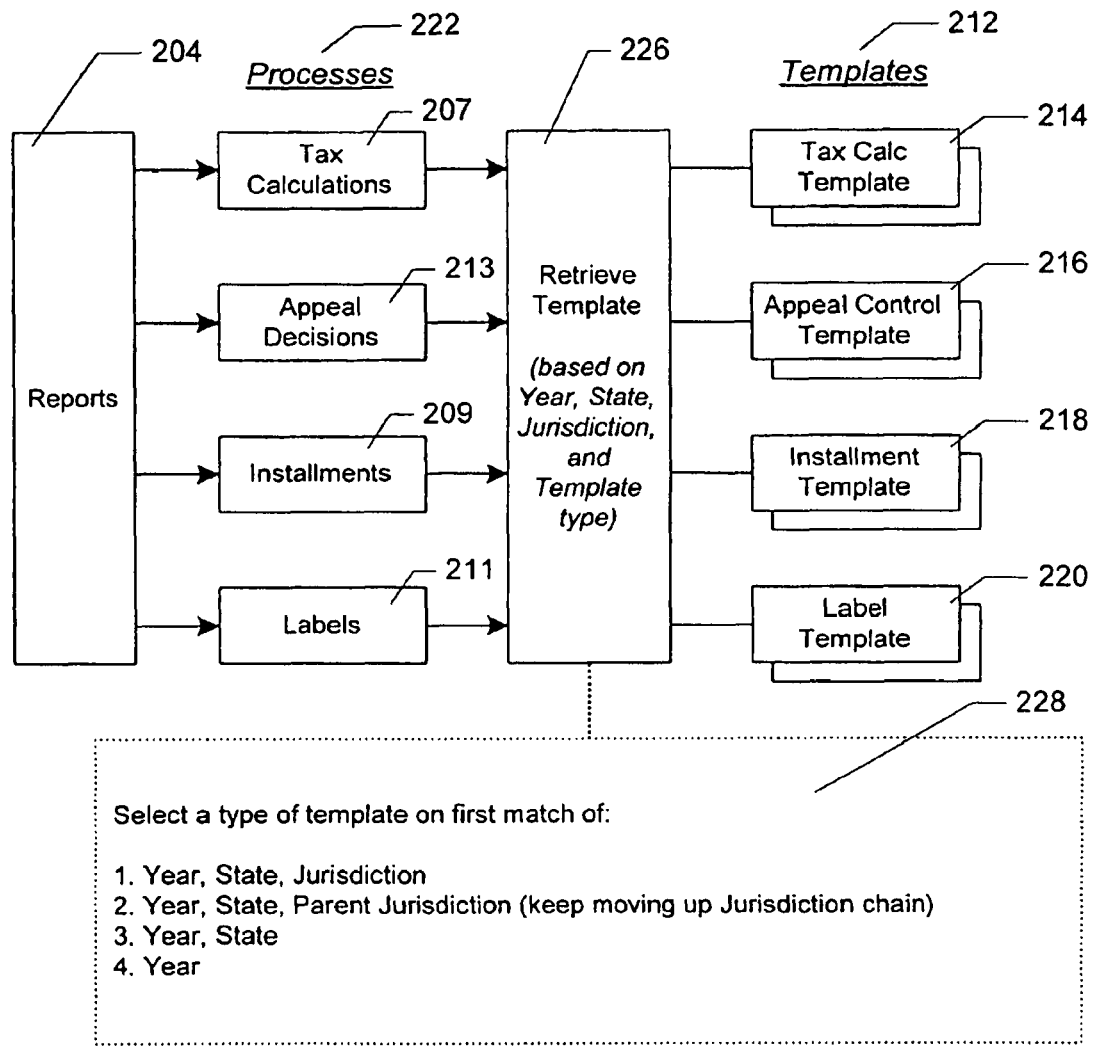
FIG. 3 is a diagram depicting the programs and process by which the property tax application selects templates to generate reports in accordance with the present invention.

Referring to FIG. 3, the property tax application includes a library of standard processes or routines for tax calculations 207, installments 209, labels 211 and appeal decisions 213. Templates 212 are linked to appropriate tables via a linking table. The types of templates include a Tax Calculation Template 214, a Valuation Template 215, an Appeals Template 216, an Installment Rules Template 218, a Dynamic Labels Template 220, a Revaluation Template 217 and a Tax Year Template 219. The System Maintenance program 206 is used for maintaining each of these types of templates 212.

The database 210 stores jurisdictional data, such as tax bill information, as well as property specific records, such as assessment history, appeal history, accounts payable history, and budgets. As will be apparent to those of reasonable skill in the art, the screen displays and other information shown in the Figures and Appendices hereto reflect the nature of the data stored in the tables and how that data is stored.

In one preferred embodiment of the system, the property tax application is written using Progress 4GL, Version 8, marketed by Progress Software Corporation of Bedford, Mass. One of ordinary skill in the art, however, will recognize that numerous other types of relational database programs and development environments could also be used to implement the present invention, including Oracle, SQL Server, or Informix, to name a few.

Appendix A is an example of source code implementing the standard processes for tax calculations 207, installments 209, labels 211 and retrieving templates 226 in a preferred embodiment of the property tax information system described herein. Appendix B is an example of source code implementing the appeal decisions process 213 in the preferred embodiment of the property tax information system described herein.

Reports Program

FIG. 3 is a flow diagram depicting the programs and process by which the property tax application selects templates 212 to generate reports of the stored data in the system. To run such a report, the Reports Program 204 is launched from the Main window 201 or other suitable menu selection. As shown in FIG. 3, the Reports program 204 calls the appropriate processes 222 for generating the requested report. Each of these processes 222 calls a retrieve template subroutine 226, which retrieves a template from the stored templates, based on the year, state, jurisdiction and template type, to match the criteria that the process seeks. The template is retrieved based on the first match of:

1. Year, State, Jurisdiction
2. Year, State, Parent Jurisdiction (keep moving up the Jurisdiction chain)
3. Year, State
4. Year By using this template retrieval hierarchy 228, the property tax application can support multiple jurisdictions, regardless of whether the jurisdictions have different tax rules.

Data Input Program

The Data Input Program 200 provides the means for creating and maintaining information in the database 210, including property information, assessment values, taxing districts (within jurisdictions and states), tax appeal information, appeal decisions (appeal process), sub-parcel information, budgets for forecasting tax obligations, important addresses (such as for clients, assessors and others), and working professional (employee related) information. The system utilizes three types of records, i.e., parcel records, addresses and working professionals. Each of these is discussed in detail below.

Parcel Records

FIG. 4 shows one embodiment of a Property Maintenance window 230 displayed on the video monitor 122, which can be used for adding, updating and deleting data in a main parcel record. The Property Maintenance window 230 includes a menu bar 232 and a toolbar 234. The menu bar 232 includes menu options corresponding to the functions that the user may perform within the open window, in this case the Property Maintenance window 230. As shown in FIG. 4, these menu options include Property 236, Assessment Information 238, Districts 240, Appeals 242, Appeal Process 244, Subparcels 246, Budgets 248 and Accounts Payable 250.

The Property menu option 236 is used to enter and maintain parcel specific property tax information. A parcel record must be created and stored in the database 210 before any other functions can be performed. The Assessment Information menu option 238 is used to enter and maintain assessment detail in the database 210. Within the system, assessment information is divided into assessment tracks. Each track has related assessment detail. The District menu option 240 is used to attach a district record to a parcel record. Each parcel record will have one, or possibly more, taxing jurisdictions attached to it. The alternative to attaching a district record to a parcel is to insert the tax rates into the assessment track. The Appeals menu option 242 can be selected to input information on new and on-going appeals. The Appeal Process menu option 244 can be selected to enter decisions regarding appeals. The Subparcels menu option 246 can be selected to attach subparcels to a parcel that is identified as a parent or lead parcel. The Budgets menu option 248 can be used to create budgets or forecasts of projected taxes based upon growth variables. The Accounts Payable menu option 250 is can be used to enter information regarding tax payments.

Referring still to FIG. 4, the Property Maintenance window 230 includes a Default Settings section 254, which displays the tax year, state and jurisdiction. A Default Settings button 256 can be selected to enter a different tax year, state and jurisdiction code. Changing these settings identifies the subset of parcel records that the user can view each time when entering the application.

A General section 258 provides the interface for inputting and displaying basic property information. In the embodiment shown in FIG. 4, only the Client ID field 260 and Parcel field 262 are required to have inputs. The tax year, jurisdiction code and state are taken from the default settings.

A Valuation section 264 provides the interface for inputting and displaying valuation information for the subject parcel, which is optional. Within the Valuation section 264, a Land section 266 can be used to input information regarding the unit of measure and size of the parcel. This information will depend on and may be obtainable from the tax rolls of the taxing authority. Also within the Valuation sections 264, an Improvements section 268 can be used to enter the information shown for the improvements. This information also will depend on and may be obtainable from the tax rolls of the taxing authority. A Base Value section 270 can be used to enter base year and base value information into the fields shown for the parcel. This information can be input directly by the user and is used by the system in a batch process for increasing base values. If the base year and base value fields are left blank, this batch process can look at the purchase price and purchase date fields in the Valuation section 264 to determine the base year and base value for the property. If this information is not available in the current year, the batch process can look at the previous year property record's Base Year and Base Value fields to derive a new year and value. A Notes field 272 can be used to enter any relevant notes about the subject parcel, such as the legal description of the parcel.

The Property Maintenance window 230 includes a Go To Parent button 274 and a Show Templates button 276. The Go To Parent button 274 can be selected to display the information for the parent or lead parcel of the currently displayed parcel if the currently displayed parcel is a subparcel. The Show Templates button 276 displays the templates that are attached to the state and jurisdiction in which the property is located. These templates are discussed in more detail below.

The Property Maintenance window 230 also includes a Tax Calculation button 278. When this button is selected, the system presents a Tax Calculation dialog box 280 that shows the various taxing jurisdictions attached to the subject parcel and allows the user to select the one(s) that the user wants to use to calculate tax on a combined and/or individual basis. FIG. 5 shows an example of such a Tax Calculation dialog box 280. When calculating taxes, the system uses the most current assessment or appeal decision information. An appeal decision always takes precedence over an assessment track's detail. As shown in FIG. 5, when calculating taxes, the user specifies in the Tax Calculation dialog box 280 whether the taxes should be calculated on the individual or combined assessment tracks, or both by selecting the appropriate assessment combination option 282. A choice of combined will add the real, personal, supplemental and non ad valorem detail together for all lead and all subparcels. Also, if there is more than one of the same track (i.e. real) for a property, the system looks at the most current information (either assessment detail or appeal decision) for both tracks, adds them up and uses the sum to calculate taxes.

Assessment Information

When the user enters initial assessment information in a parcel record as shown in FIG. 4, the system automatically creates a real property assessment track. This assessment track's related assessment detail is then automatically populated with the information from the parcel record. To add, update and delete assessment tracks and related detail, the user can select the Assessment Information menu option 238 from the menu bar 232. The system will then display an Assessment window 282 such as that shown in FIG. 6, which includes an Assessment Track section 284 and an Assessment Detail section 286. Using the Assessment window 282, the user can add, update and delete assessment tracks and related detail for real property, personal property or supplemental assessment tracks. By selecting a prorata track option 288, a prorata track can be defined, which will override the specific track that it is attached to a property based upon a specific date. When the user selects the Tax Calculation button 278 to calculate taxes from the parcel displayed in the Property Maintenance window 230, the system will use the last assessment track and related detail unless there is an appeal decision record (discussed below), which takes precedence over assessment tracks.

Districts

Districts from available taxing jurisdictions can be attached to parcel records by selecting the Districts option 240 from the menu bar 232. When this option is selected, the system will display a Districts dialog box 290 like that shown in FIG. 7. The Districts dialog box 290 displays a complete listing of all assessment tracks 284 for the subject parcel. The user can select a District Code field 292, as shown in FIG. 7, to display a browser with all districts for the displayed taxing jurisdiction.

Appeals

The Appeals option 242 of the menu bar can be selected to enter information regarding appeals and billings for a parcel record 252. Selection of the Appeals option 242 will display an Appeal window 294, such as that shown in FIG. 8, which includes an Appeal tab 296 and a Billing tab 298. In the system, appeals are attached to specific assessment tracks. FIG. 38 is a flow diagram illustrating the steps for setting up the basic information for the appeal records.

To enter an appeal record, the user selects the Appeal Tab 296 of the Appeal window 294 and selects an assessment track from a displayed list of assessment tracks 284 to which the appeal will be attached. An "A" designation to the left of a track indicates a track that is currently under appeal.

Figures 16, 17:
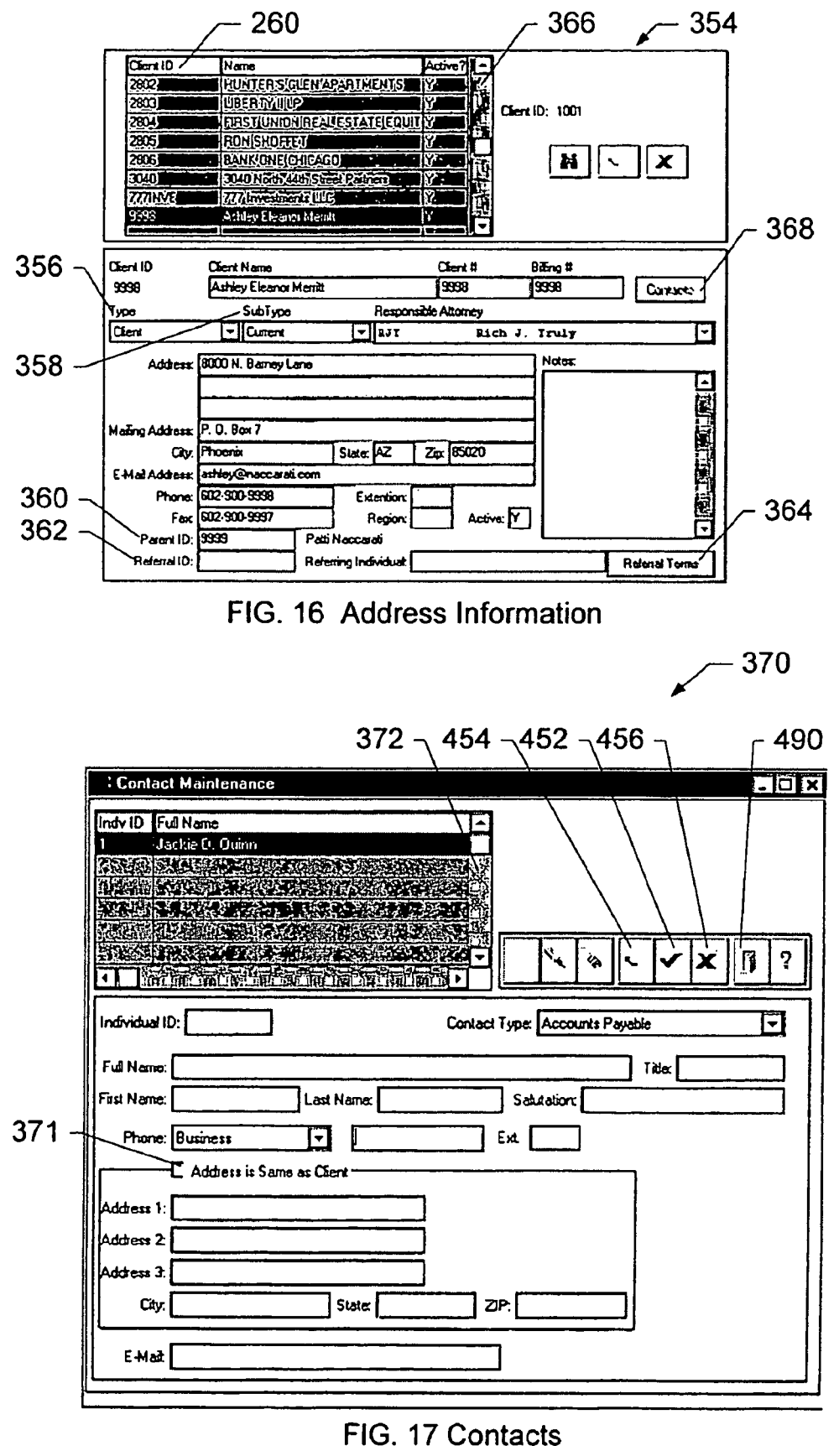

Other information regarding the appeal can optionally be entered into the fields in an Appeal Record section 300 of the Appeal window 294. As shown in the Appeal Record window 294, an appeal record can include a Responsible Professional field and a Working Professional field. Both of these fields use working professional records entered into system using an Address window 354 as shown in FIG. 16 and discussed below. A responsible professional is the lead person responsible for the appeal. A working professional, on the other hand, can be anyone employed in the user's office that may be assigned to an appeal or a docket event. To enter an active appeal, working professionals are not required, although they are used in other parts of the system. A Reason Code field is provided for entering reasons for the appeal, as defined by the user. Reason Codes are not required to enter an active appeal.

An appeal record can also include a Consultant field, which uses a consultant record that has been entered into the system using the Address window 354 as shown in FIG. 16 and discussed below. The user may also want to define a Client Type for the consultant. Consultants, if engaged, usually have a fee agreement. The fee agreement is defined in the Billing Tab 298 discussed below. The Consultant field is not required to enter an active appeal.

Referring again to FIG. 8, in an Appellant Code field is entered a code that is defined by the user. For example, this field may be used to identify the ownership types such as owner, tenant, beneficiary of trust, etc. Appellant Codes are not a required to enter an active appeal. In an Appeal Code field is entered a code that is defined by the user's organization. Appeal Codes are not required to enter an active appeal.

Figures 8, 9:
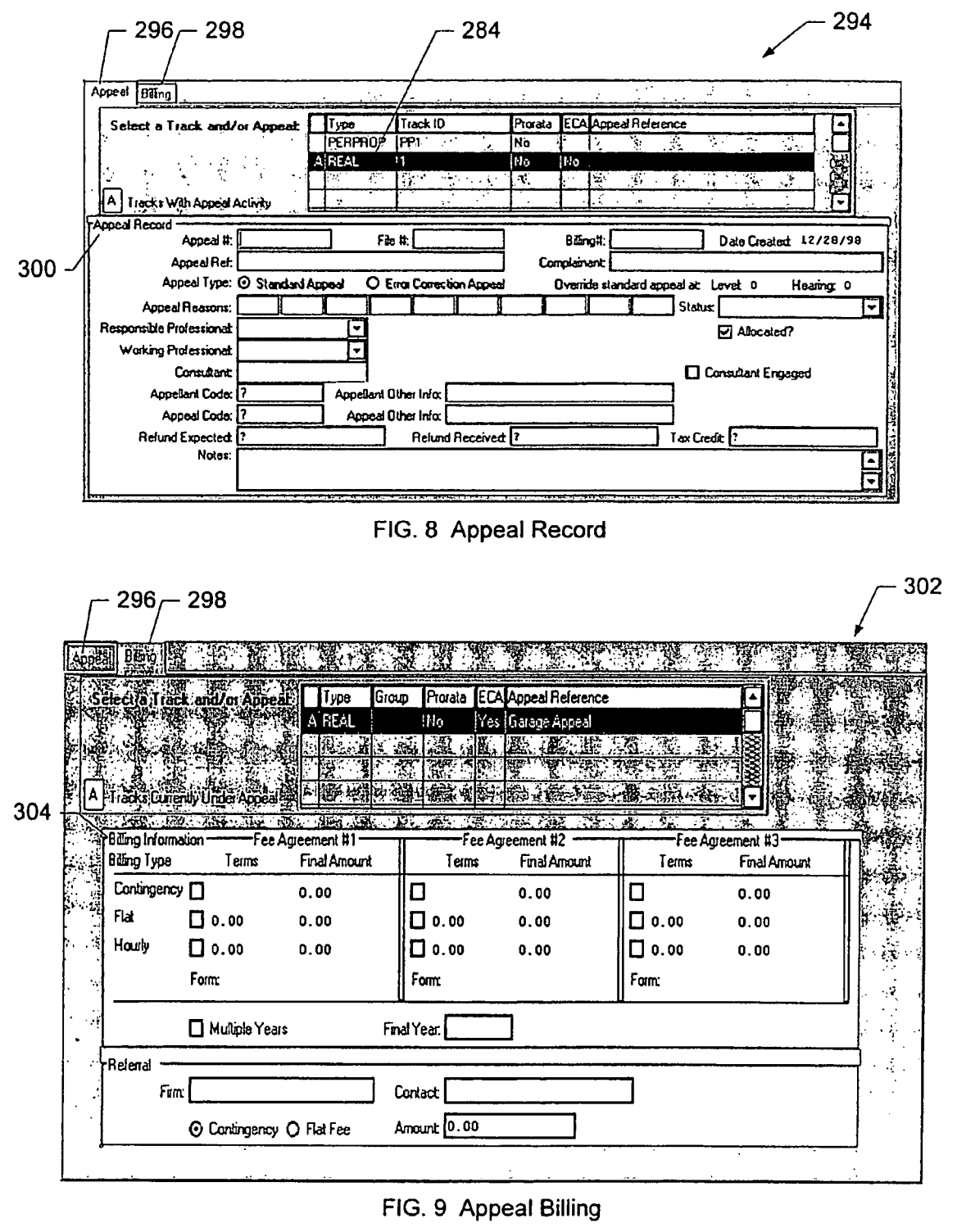

Once an active appeal record has been set up, billing information 304 for that appeal may be set up by clicking on the Billing tab 298 of the Appeal Record window 302, which will display the information shown in FIG. 9. There are three possible fee arrangements, any combination of which can be used to set up a billing record. Billings may be spread out over multiple years. In addition, referral information may be attached to the appeal.

Appeal Process

The Appeal Process menu option 244 can be used to input decision data on specific appeals. When this option is selected, the system displays an Appeal Process window 306 such as the example shown in FIG. 10. The system uses value and rate information from this window to calculate taxes. Dates and times entered into the fields of the Appeal Process window 306 are automatically transferred into the docketing system of the Docket/Calendar program 202. The Appeal Level and Appeal Hearing are taken from the Appeal Control Template 694 (see FIG. 40) that is attached to the taxing jurisdiction. Each time the user adds a new appeal to the database 210, the next level as defined by that template is automatically selected.

Sub Parcels

Subparcels may be added to or deleted from a lead or parent parcel by selecting the Subparcel menu option 246 from the menu bar 232. When selected, the system will display a Subparcel dialog box 307 such as that of FIG. 11 for this purpose.

Budgets

The Budgets option 248 of the menu bar 232 can be used to access the budgeting function of the system. When this option is selected, the system will display a Create Budgets window 308, an example of which is shown in FIG. 12. The system uses the most current assessment detail 286 (see FIG. 6) or the latest appeal decision (see FIG. 10) to calculate a budget. An appeal decision, for which an actual value exists, will always override a track's assessment detail. If, for example, there is more than one 'real' property assessment track, the budget will look at the most current assessment detail or appeal decision for each track, add them up and use the combined figure in the budget calculations. When calculating a budget, the user can specify whether to use the real, personal, supplemental or combined assessment detail and/or appeal decisions to generate the budget.

As shown in FIG. 12, the Create Budgets window 308 displays a scrollable list of available budgets 310. To create a budget, the user enters the information into the fields shown in FIG. 12. In the Budget Name field 312, the user enters the name of the budget. In the FCV (or True Value) Increase field 314, the user enters a percentage that the Full Cash Value is expected to increase over the number of years for which the budget is generated. In the FCV (or True Value) Rate Increase field 316 the user enters a percentage that the district tax rate is expected to increase for the Full Cash Value over the number of years for which the budget is generated. In the LPV (or Other Value) Increase field 318, the user enters a percentage that the Limited Property Value is expected to increase over the number of years for which the budget is generated. In the LPV (or Other Value) Rate Increase field 320, the user enters a percentage that the district tax rate is expected to increase for the Limited Property Value over the number of years for which the budget is generated. In the Years to Forecast field 322, the user enters the number of years for which the budget will be generated. The increases in the fields discussed above will be applied to each year using the previous year's value. If the property has subparcels attached to it and the user enters a checkmark in the Entire Property checkbox 324, the system will create the budget for the combination of all properties. If the user enters a checkmark in the Track Installments checkbox 326, the system will generate installment payment information for each year of the budget according to the installment template that was attached to the taxing jurisdiction. In the Budget On This Track Type section 328, the user selects the type of assessment track upon which to calculate the budget.

Once the above information has been defined, the user can generate the budget by highlighting the budget name in the scrollable list 310 and selecting the Open Budget button 332. FIG. 13 shows an example of a Budget Worksheet window 338 that displays a budget generated in this fashion. From the Budget Worksheet window 338, the user can change any cell within the budget by clicking on it and entering a new value, can save the budget by selecting the Save Budget button 340, can recalculate the budget by selecting the Recalculate Budget button 342, can restore the budget to the last saved version by selecting the Restore to Last Saved button 344 and can reset the budget to its original values by selecting the Start Over button 346.

Accounts Payable

Figures 14, 15:
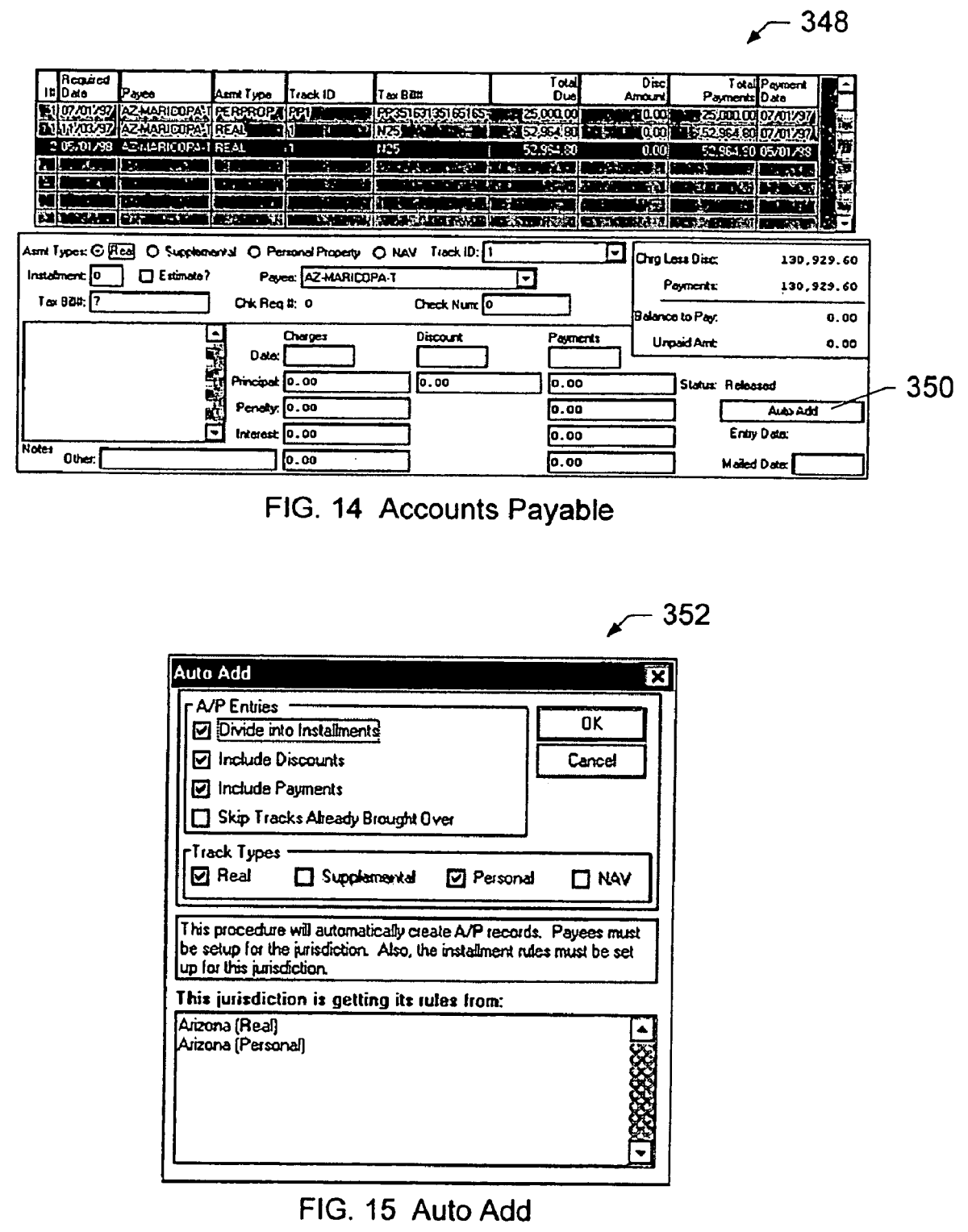

The Accounts Payable menu option 250 can be selected from the menu bar 232 to access the accounts payable function of the system. When this option is selected, the system will display an Accounts Payable window 348 like the example shown in FIG. 14. The system can track tax payments according to the appropriate installment template. Tax payments can be manually entered or automatically calculated. If the user does not want to enter tax installments manually, the system can calculate them automatically using the tax calculation template and the installment rules that have been assigned to the system, state or taxing jurisdiction. To automatically create accounts payable records, the user selects the Auto Add button 350, and the system displays an Auto Add dialog box 352 like that shown in FIG. 15. If tax installments and/or payments have already been entered for the property, the system will not automatically calculate new installments and/or payments until the previous ones have been deleted.

Addresses

In the system, addresses can be clients, payees, taxing jurisdictions, and the like. FIG. 16 shows an Address Information window 354 that can be used to enter and maintain address information. As reflected in the Address Information window 354, all the addresses for the system are subdivided by type and sub-type. For example, a type of client may have sub-types such as a current client and a prospective client. The Client Type field 356 and Client Sub-Type fields 358 are user-definable to help the user distinguish between different types of addresses. Addresses may also have a Parent ID 360, which assists the user in tracking relationships between clients that may have individual records. Addresses (clients, more specifically) may also have a referring individual and referral terms, which can be entered using the Referring Individual field 362 the Referral Terms button 364. Referral terms can be defined for the referring individual. After an address has been stored in the database 210, a scrollable list 366 can be used for selecting stored address information for display.

After defining a specific address for a client or a payee, there may be additional contacts that a user wishes to attach to that address record, for example if the address is for an organization for whom the user wants to keep information. To attach additional contacts to the record, the user can select the Contact button 368, and the system will display a Contacts dialog box 370 like that shown in FIG. 17. The Contacts dialog box 370 includes a scrollable list of contacts 372. Again referring to FIG. 16, referral fees may be attached to the Referring Individual 362 by selecting the Referral Terms button 364. The system will then display a Referral dialog box 374 like that shown in FIG. 18. The Referral dialog box includes a Types field 376 for indicating the type of the referral, such as Flat Rate, Percent of Recovery or Percent of Value.

Working Professionals

Within the system, working professionals information defines the people in the user's organization that may take a lead or supportive role in working with specific appeal cases. The system also uses this information in docketing. FIG. 19 shows a Working Professionals window 380 that can be used to enter and maintain this information. As reflected in the Working Professionals window 380, relevant information can be entered into fields for an individual ID 382, Name 384, Title 386, Number 388 and Attorney identifier 390 for each working professional. A scrollable list 391 of working professionals stored in the database is also provided.

Docket/Calendar Program

The Docket/Calendar program 202 provides the means to set up and define docketing requirements and to view, enter and delete docket information. In a preferred embodiment of the system, the system has six pre-defined docket types: General, Assessment, Property, Appeal General, Appeal Process and Accounts Payable. In addition, the user can define docket types that are unique to a state or jurisdiction. Docket events are user defined and can be any event that relates to one or more docket types. Any important date, including office holidays, can be docketed in the system. Docket types can be linked to a state record, a jurisdiction record, a property record or an appeal record.

The General docket type is intended for a docket entry that is not specific to a property or appeal. An example might include an appointment with the user's dentist. The Property docket type relates to a property docket events. The Appeal General docket type is intended for docket types that occur in the course of setting up an appeal. There are four predefined Appeal Process docket events, the dates and times of which will automatically be posted in the Docketing program 202 and appear on the calendar. These predefined docket events include Filing Deadline, Date Filed, Hearing and Decision. There are four predefined docket events for Accounts Payable, the dates of which will automatically be posted in the Docketing program and appear on the calendar. They are Tax Due, Tax Payment, Discount and Assessment.

FIGS. 20 and 21 show a Docket and Calendar window 392, from which the user can access the docket and calendar functions of the system. The Docket and Calendar window 392 includes a Calendar tab 394 and a Docket Entry tab 396. As shown in FIG. 20, the Calendar tab includes selection fields for the Year 398 and Month 400, which are used to select the calendar view. The calendar can be viewed for any number of years and months in the future or the past, depending on the years for which it has been generated. A Show Current Property 402 or All Events option 404 gives the user the option to show all docketing events for the selected year and month or only those that apply to the property identified in the Parcel field 262 in the Default Information section 408. A scrolling list of Docket Events 410 displays all docket events for a particular day in the year and month selected. The default is the present day's date. The user can view a different day's docket events by clicking once on the date in the Monthly Calendar 412. The Monthly Calendar 412 shows every day of the selected year/month. Certain docket types are graphically represented on the calendar. A yellow sun 414 on the calendar day indicates a company wide event such as a holiday. A red clock 416 indicates an Appeal Process docket event. A blue clock 418 indicates an Appeal General docket event. A green clock 420 indicates an Assessment docket event. A gray clock 422 indicates other docket events. A Detailed Docket Information section displays the detail for the event that the user has highlighted in the scrolling list. A Default Information section 408 can be used to set the tax year 426, state jurisdiction 428, and client information 260 to display in the Monthly calendar 412. In addition, the user can view a specific property and appeal number.

Referring to FIG. 21, the Docket Entry tab 396 of the Docket and Calendar window 430 gives the user the capability to view, enter and delete specific docket information. The toolbar can be used to add new and delete existing docket entries. A Show Dockets for Current Property Only checkbox 432 can be checked to display docket entries for the parcel listed in the Default Information 408. A Show Only Dockets of Type checkbox 434 can be checked to display only a specific type of docket entry. A pull down list 436 is provided for selecting the docket type to display. A scrolling list of docket events 438 displays a list of the dockets according to the criteria the user has selected. Detail of the docket that is highlighted in the scrolling list is displayed in a docket detail section 439. A Default Information section 408 can be used to set the Year, State, Jurisdiction, and Client for which information will be displayed in the calendar. In addition, the user can use the Parcel field 406 and Appeal # field 424 to display information in the calendar for a specific property and appeal number.

System Maintenance Program

The System Maintenance program 206 stores all of the tables for setting up the property tax application. When the property tax application is installed on a computer, the data for these tables must be entered for the programs that the user will be using. In a preferred embodiment, only the system master record and a company master record must be entered before creating properties.

Data that is entered in the other programs, such as appeals or parcel records, is verified against the information that is built in the System Maintenance program 206. For example, when entering a parcel record using the Data Input program 200, the property tax application checks the validity of the property type and the format of the parcel number against the appropriate system tables. In the System Maintenance program 206, records are built for system controls, region controls, codes and batch programs.

System controls contain information that is common to all programs of the property tax application. Region controls are those settings that will vary by state, jurisdiction and district. For example, if the user's organization monitors properties in multiple states, then the rules will vary by state. Within a state, each jurisdiction may have different property tax rules. The system provides complete flexibility in setting up these property tax rules. Region controls include setting up states, jurisdictions and districts. Control information for appeals, which may vary by state, jurisdictions and/or districts, are set up in region controls. Tax calculations and valuation input templates are also set up in region controls. Certain field labels within the property tax application are customizable to accommodate different naming conventions.

Codes are completely user definable. They help the user define the types of addresses (client, payee, etc.), docketing parameters, property types and uses, and appeal information in a way that is consistent with the relevant state, jurisdiction or district.

Batch Programs are used for year-end functions, such as the tax rate rollover.

State and Jurisdiction Set Up

Each state is subdivided into jurisdictions, which may have different property tax rules. The system provides flexibility in setting up these rules to allow the user to monitor properties in various states and jurisdictions that may have different rules. FIG. 22 shows a flowchart for creating a state within the system, setting up jurisdictions for each state, and linking payees to the jurisdictions.

To create a state in the system the user utilizes a State Set Up window 444 like that of FIG. 23. Referring to FIG. 23, the user selects the toolbar Add button (not shown) and in the State Code field 446, enters a two-digit upper case alpha abbreviation of the state. In the State field 448, the user enters the complete name of the state. The user then selects the toolbar Commit button (not shown) to save the record. Alternatively, to clear all fields and start over, the user can select a Reset button on the toolbar (not shown). To cancel input and restore the original field values, the user can select a Cancel button on the toolbar (not shown).

Creating Jurisdictions

Within the system, each state is further subdivided into jurisdictions. To enter a new jurisdiction for a particular state or to modify information for a jurisdiction already entered, the user can use a Jurisdiction Set Up window 458, an example of which is shown in FIG. 24. The user first selects a state that has been created in the system as follows. In the scrollable list of states 460, the user finds the state for which he or she wants to create or modify a jurisdiction record. The user then clicks on the state to highlight it. The example in FIG. 24 shows Arizona highlighted. From the toolbar 234, the user then clicks once on the Add button 450, or Add Continuous button 462 if adding many jurisdictions to the same state, to enable the data entry fields. If the user is modifying an existing jurisdiction, in the Select a Jurisdiction section 464 the user highlights the appropriate jurisdiction shown in the scrollable list of jurisdictions 465 and clicks on the Update button 406 to display the existing information for the highlighted jurisdiction.

Whether adding or updating a jurisdiction record, the user enters an acceptable abbreviation for the jurisdiction in the Jurisdiction Code field 466. For example, in the State of Arizona, Greenlee County is abbreviated as GRE. In the Juris Name (Jurisdiction Name) field 468, the user enters the complete name of the jurisdiction, for example, Greenlee County. The Rate Year field 470 is the year of the tax rates that are currently being used by the jurisdiction. This year should be available from the jurisdiction. In some states, such as Arizona, the rate year will be different from the tax bill or valuation year. It isn't until the end of the year that the tax rates are adjusted to reflect the current valuation year. In other states, the current valuation year and the rate year will be the same. The user manually changes this field when the rate year changes.

It is possible that some jurisdictions are subordinate to other jurisdictions. The main jurisdiction is called the 'parent.' If the user is creating a subordinate jurisdiction, its 'parent' jurisdiction code is entered in the Parent Juris Code field 472 of the Jurisdiction Set Up window 458. Otherwise, this field is left blank.

Each jurisdiction will have a format by which parcels are identified. The system gives the user the ability to create a format that is consistent with the jurisdiction. To create the Parcel Format in the system, the user must know the format that the jurisdiction uses, which is entered into the Parcel Format field 473. In creating the Parcel Format, the following rules apply. A fill character is any letter, number or special character other than the 9, N, X, A or ! that will take a permanent place in the field when data is entered. If the 9, N, X, A or ! need to be used as fill characters, they must be proceeded with a ~(tilde).

After all of the information in the jurisdiction fields has been entered or updated, the user can then click on the Commit button 452 on the toolbar 234 to save the record. Alternatively, to clear all fields and start over, the user can click once on Reset button 454. To cancel input and restore the original field values, the user can click once on the Cancel button 456.

Attaching Payees to a Jurisdiction

After adding jurisdictions to their applicable states, the user can attach a payee to each of the jurisdictions. The Data Input program 200 is used to enter payees into the system as address records as previously described. The process of attaching a payee to a jurisdiction entered into the system will now be described.

The system allows a user to select the entity to which the taxes for a particular jurisdiction will be paid. To select one or more payees to attach to a jurisdiction stored in the database 210, the user clicks on the Payees button 474 in the Jurisdiction Set Up window 458 of FIG. 24. The system then displays a Jurisdiction Payee window 476 like that shown in FIG. 25. The Jurisdiction Payee window 476 includes a scrollable list of payees 478 that have been attached to the jurisdiction and a Payee Detail section 480 that displays payee information that has been created using the Address Information window 354 (see FIG. 16). The information in the Payee Detail section 480 cannot be changed from the Jurisdiction Payee window 476. Rather, the user can only attach, update or delete a Payee ID to the jurisdiction.

When the user selects the Payee ID field 482 in the Jurisdiction Payee window 476, the system displays a client browser 484 like that of FIG. 26. In the client browser 484, the user can select and enter a specific Client ID 260 from the scrollable client list 366 by highlighting the desired client and clicking on the Commit button 452. The selected client will appear in the scrollable list of payees 478 of the Jurisdiction Payee window 476 (see FIG. 25). The user clicks on the Commit button 452 in the Jurisdiction Payee window 476 to attach the selected client to the jurisdiction as a payee. To set a specific payee as the default, the user can highlight the payee in the scrollable list of payees 478, click once on the Update button 406 and check the Set As Default checkbox 486. The user then clicks on the Commit button 452, and the payee that has been designated as the default will show up in the Payee ID field 482. When the user has added all of the payees for the jurisdiction, selecting the Exit button 490 will return to the Jurisdiction Set Up window 458.

Adding Contacts to a Payee

Referring again to FIG. 25, a Contacts button 492 in the Jurisdiction Payee window 476 can be used to add a contact name to the information shown in the Payee Detail section 480. To add, update or delete one or more contacts for a particular payee, the user highlights the appropriate payee in the payee scrollable list 478 for which the contact information will be, added, updated or deleted and clicks on the Contacts button 492. The system then displays the Contact Maintenance window 370 (FIG. 17). The user can then enter the information in the relevant fields shown in FIG. 17. If the contact's address is the same as the address of the Payee shown in the Jurisdiction Payee window 476 (FIG. 25), the user checks the Address is Same as Client checkbox 371 in the Contact Maintenance window 370. The address, city, state and zip fields below the checkbox 371 will be unavailable. If the contact's address is different from the address of the Payee, the user enters the address information in the address fields. The user then clicks on the Commit button 452 to save the record. Alternatively, to clear all fields and start over, the user can click on the Reset button 456. To cancel input and restore the original field values, the user can click on the Cancel button 454. To return to the Jurisdiction Payee window (FIG. 25), the user clicks on the Exit button 490.

Creating Districts for a Jurisdiction

There are two methods for attaching tax rates to a parcel record within the system. The first is to plug tax rates directly into the parcel record. The second method is to create districts, according to a particular jurisdiction, with the applicable tax rates. FIG. 45 shows a monitor display of a Districts Set Up window 744 for creating taxing districts for a jurisdiction stored in the database of the property tax system.

To add a district to a jurisdiction, the user selects the year, state and jurisdiction (not shown) for which the district will be created and clicks the Add button (not shown), which will enable entry of data into the following fields. In a District Code field 746 a district code provided by the jurisdiction is entered. In a Description field 748, a description of the district being created is entered. In a Class field 750, the classification of the district code provided by the jurisdiction is entered. In a TV Rate field 752, the appropriated district tax rate is entered. If the district has a second tax rate, this rate is entered in an OV Rate field 754. The TV Rate field 752 and the OV Rate field 754 can be labeled with other labels, depending on the state and jurisdiction, by using the Label Template window 726 described below (see FIGS. 43A and 43B). For example, for Arizona the TV Rate field 752 is labeled "FCV Rate" and the OV Rate field 754 is labeled "LPV Rate", as can be seen in FIG. 6. Some states or jurisdictions may not have a second value, in which case the OV Rate field 754 would not apply.

If the district is a special district, a checkmark is entered in a Special District checkbox 756 and the type of special district is selected from a pull down list and entered into the Type field 758. Available types in the list include an Acres option if the special district applies the TV Rate to the property's acreage to derive a tax and a Direct option if the special district uses the Base Value field when the district is attached to a parcel. If the Direct option is selected, the TV Rate and OV Rate will be ignored. An example of a direct tax is when property is assessed a tax based on linear frontage on a public street. A Use in Update field 760 is used with a Roll Tax Rates batch program. If a "Y" is entered in this field, when the batch program is initiated, parcel records with this district record attached to them will be updated to the new rates in the district record. If an "N" is entered in this field, when the batch program is initiated, parcel records with this district record attached to them will not be updated to the new rates in the district record. The Use in Update field 760 is only relevant when new district rates have been issued and the district records have been updated before running the Roll Tax Rates batch program. After the user has completed the input fields in the District Set Up window 744, the user clicks on the Commit button (not shown) to save the record. Alternatively, to clear all fields and start over, the user can click on the Reset button 456. To cancel input and restore the original field values, the user can click on the Cancel button 454.

To update an existing district, the user can highlight the desired district in the scrollable district list 762 and click once on the toolbar Update button (not shown), which will display the existing information stored in the system for the selected year, state and jurisdiction. The user can then update this information as desired and can click on the Commit button (not shown) to save the updated information.

Displaying a Jurisdiction's Templates

Referring again to FIG. 24, in the Jurisdiction Set Up window 458, the Show Templates button 494 can be used to show the templates that have been attached to the jurisdiction. There are seven types of templates that can be attached to a jurisdiction, i.e. a Tax Calculation Template 214, a Valuation Template 215, an Appeal Control Template, an Installment Rules Template 218, a Dynamic Labels Template 220, a Revaluation Template 217 and a Tax Year Template 219. When the Show Templates button 494 is selected, a Templates dialog box 496 like that shown in FIG. 30 is displayed. The Templates dialog box 496 includes a scrollable list of templates 498 attached to the jurisdiction for the selected year. To see the templates from a previous or future year, the user enters the year in the For Year field 500 and clicks on the Commit button 452.

Template Set Up

After creating the naming conventions for the jurisdictions and entering district rates, the templates that are used by the various taxing and valuation entities can be created. FIG. 27 is a flow diagram showing the steps for creating these templates 502.

At its simplest level, a template can be attached to the system master record. Templates attached to the system master record become the default templates for all parcels in the system, regardless of state or jurisdictional uniqueness. At the next level, a template can be attached to a state, which then becomes the template used for any parcels in that state. At the next level, the user can attach templates to the jurisdiction level.

Tax Year Template

The Tax Year Template 219 defines the month and day that a particular property tax year begins and ends. The tax year template 219 is not dependent upon a specific year. It defines the beginning and end dates regardless of the specific year.

Creating a Tax Year Template

Still referring to FIG. 28, to create or modify a tax year template 219, the user uses the Tax Year Template dialog box 504. To create a new tax year template 219, the user clicks once on the toolbar Add button (not shown). In the Name field 510, the user can enter the correct name for the tax year template. The user can define the Start Year from the options shown in the Start Year section 515 and the Next Year from the options shown in the Next Year section 517. To update an existing template, the user can highlight the desired template in the scrollable tax year template list 512 and click once on the toolbar Update button (not shown), which will display the existing information stored in the system for the selected tax year template. The user can then update this information as desired. Whether adding or updating a template, the user can click on the Commit button (not shown) to save the information. Alternately, the user can click on the Reset button (not shown) to reset all the fields to their default values. The user can click on the Cancel button 456 to ignore all changes to the record and to exit the Tax Year Template window.

FIG. 28 shows a Tax Year Template dialog box 504 displaying the tax year template for the State of Arizona 504. For Arizona, the tax year coincides with the calendar year. Thus, in the Start Year section 515 a 1 is entered into the Start Month field 506 for January, a "1" is entered into the Start Day field 505 for the $1^{st}$ day of the month and the Current Year option 509 is selected. The end date of the tax year is December $31^{st}$ of the current year, so in the End Year section 517 a "12" is entered into the Start Month field 508, a "31" is entered into the Start Day field 511 and the Current Year option 513 is selected. Other states may have a property tax year that starts in the current year and ends in the next year. In Indiana, for example, the property tax year begins on March $1^{st}$ of the current year and ends on February $28^{th}$ of the next year. Data stored in the Tax Year Template 219 is used for prorata tracks in assessments, tax calculations and moving district rates from one year to the next.

Linking a Tax Year Template

After a tax year template is created, it can be linked to the system master record, a state record or a jurisdiction record. Links to a jurisdiction will take precedence over state or system master links. It is possible, however, that a state, e.g. Arizona, will have a template and that a jurisdiction, such as Maricopa County, will also have a template link. It is also possible that a jurisdiction will have a link to a template but the state in which the jurisdiction resides will not have a link. Links to a state will take precedence over a system master link. If a state has a link to a template, then all jurisdictions that do not have a specific template link will use the template linked to the state. If a state or jurisdiction does not have a template linked directly to it, the link to the system master record will prevail.

To create a link to a tax year template, a user does the following. From the Tax Year Template dialog box 512 of FIG. 28, the user highlights in the scrollable list 512 the template to be linked to the system master, state or jurisdiction and clicks on the Links button 514. The system then displays the Tax Year Link window 516 of FIG. 29.

The Tax Year Link window 516 includes a Show object 518 in which there are several options that determine what is displayed in a scrollable list 519. These options do not influence how a template is linked. If the All option 526 is selected, then all records (system master, state, and jurisdictions) with links to the selected template will be displayed. If the System Master option 524 is selected, then only one record will be displayed, indicating that the template is linked to the system master record. If the State option 522 is selected, only the states that have a link to the selected template will be displayed. If the Jurisdiction option 520 is selected, then only jurisdictions that have a link to the selected template will be displayed.

Still referring to FIG. 29, the user clicks once on the Add button 450 to create the link. The user then selects one of the following linking options based upon the level at which the user wants to link the template. The Jurisdiction level option 521 is selected to link the template to a specific jurisdiction within a state. The State level option 522 is selected to link the template to a specific state. The System Default level option 528 is selected to link the template to the system master record. If the user has selected the System Default level option 528, then neither the State field 448 nor the Jurisdiction Code field 530 will be available. If the user has selected the State option 522, then only the State field 448 will be available. The user can then select the State field 448, such as by double clicking on it, which will display a browser with a list of states stored in the database 210. The user can highlight the state to link to the template and click once on the Commit button 452 to select the state and return to the Tax Year Template window 504. If the user selected the Jurisdiction level option 521, then both the State field 448 and Jurisdiction Code field 530 will be available and must be filled in the manner previously described, which can be accomplished using a browser display of states and a browser display of jurisdictions (within the selected state). To save the record, the user clicks once on Commit button 452. Alternatively, to clear all fields and start over, the user clicks once on the Reset button 454. To cancel input and restore the original field values, the user clicks once on Cancel button 456. The user can then repeat the above process until all appropriate links for the selected tax year template have been completed.

Still referring to FIG. 29, to update an existing template, the user can highlight the desired template in the scrollable template link list 554 and click once on the toolbar Update button 406, which will display the existing information stored in the system for the selected tax year template link. The user can then update this information as desired and save it in the system using the Commit button 452.

Revaluation Template

The revaluation template 217 is used to determine the cycle with which property (real or personal) is revalued. Revaluation cycles vary by state and, occasionally, by jurisdiction. For example, in the State of Arizona, real property is revalued every other year. In the State of Indiana, for another example, real property is revalued every four years. Using the revaluation template 217, the user can define the number of years in the cycle and the year in which the cycle begins.

The Revaluation Template 217 is used for budgeting and property copy, a batch function that moves properties from one year to the next. There are two fields in the parcel record that are affected by the revaluation template 217, i.e., the Val Year field and Rev Cycle field (see FIG. 4). These fields pull their information from the revaluation template 217 that is linked to the state or jurisdiction in which the property resides.

Creating a Revaluation Template

To add or update a revaluation template, a Revaluation Template window 532 like that shown in FIG. 31 is used. To add a revaluation template 217, the user clicks once on the toolbar Add button (not shown). In the Template Name field 534, an appropriate description for the template is entered. In the Reval Cycle field 536, the number of the years in the revaluation cycle for this template is entered. For example, in FIG. 31 a "2" indicates an every other year is a revaluation cycle. Clicking on the Apply button 538 will cause the years in which revaluation may occur to be highlighted in bold in the Potential Reval Years scrollable list 540. The next step is to evaluate the start year of the revaluation by using the Move Back button 542 or Move Forward button 544 in the Revaluation Template window 532. The Move Forward button 542 moves the years forward one year with each mouse click. The Move Back button 544 moves the years backward one year with each mouse click. Using these buttons, the user can adjust the revaluation years to meet the state and/or jurisdictions requirements. If parcels within the jurisdiction have different revaluation cycles, the user checks the box labeled "The parcels in this jurisdiction do not follow the same reval rules" 546. In this situation, the Val Year field and Rev Cycle field in the parcel record (see FIG. 4) must be manually adjusted to accommodate unique revaluation cycles. The user saves the record by clicking on Commit button 452. Alternatively, to clear all fields and start over, the user can click on the Reset button 454. To cancel input and restore the original field values, the user can click on the Cancel button 456.

Still referring to FIG. 31, to update an existing revaluation template, the user highlights the desired template in the scrollable list of revaluation template names 533 and clicks on the toolbar Update button (not shown), which will display the existing information stored in the system for the selected revaluation template link. The user can then update this information as desired and save it in the database 210 using the Commit button 452.

Linking a Revaluation Template

After the revaluation template 217 is created, it must be linked to the system master record, a state record or a jurisdiction record. Links to a jurisdiction will take precedence over state or system master links. It is possible that a state, i.e. Arizona, will have a template and that a jurisdiction, such as Maricopa, will also have a template link. It is also possible that a jurisdiction may have a link to a revaluation template but the state in which the jurisdiction resides does not have a link. Links to a state will take precedence over a system master link. If a state has a link to a revaluation template, then all jurisdictions that do not have a specific template link will use the template linked to the state. If a state or jurisdiction does not have a revaluation template linked directly to it, the link to the system master record will prevail.

Referring still to FIG. 31, to define a link to a revaluation template, the user highlights the template to be linked in the scrollable revaluation template list 533 and clicks on the Links button 514. The system then displays a Revaluation Link window 552 like the example shown in FIG. 32. The Revaluation Link window 552 includes a Show object 518 having several options that will determine what is displayed in a scrollable template link list 554. These options do not influence how a template is linked. If the user selects the All option 526, then all records (system master, state, and jurisdictions) with links to the selected template will be displayed. If the System Master option 524 is selected, then only one record will be displayed indicating that the template is linked to the system master record. If the State option 522 is selected, the only states that have a link to the selected template will be displayed. If the Jurisdiction option 520 is selected, then only jurisdictions that have a link to the selected template will be displayed.

Still referring to FIG. 32, the user then clicks on the Add button 450 to create a link and select one of the following based upon which level at which the template will be linked. The user selects the Jurisdiction level option 521 to link the revaluation template to a specific jurisdiction within a state, the State level option 522 to link the template to a specific state or the System Default level option 528 to link the template to the system master record. If the user has selected the System Default option 528, then neither the State field 448 nor the Jurisdiction Code field 530 will be available. If the user has selected the State level option 522, then only the State field 448 will be available and the user can use the browser to enter a state stored in the system in the manner previously described. If the user has selected the Jurisdiction level option 520, then both State field 448 and Jurisdiction field 530 will be available and must be filled in. The user can do this using the browsers in the manner previously described. After the fields are completed, the user clicks on the Commit button 452 to save the record. Alternatively, to clear all fields and start over, the user can click on the Reset button 454. To cancel input and restore the original field values, the user can click on the Cancel button 456. The user then repeats this process until appropriate links for the selected template have been completed.

Still referring to FIG. 32, to update an existing template, the user can highlight the desired template in the scrollable template link list 554 and click once on the toolbar Update button 406, which will display the existing information stored in the database for the selected template link. The user can then update this information as desired and save it in the database 210 using the Commit button 452.

Tax Calculation Template

The property tax application calculates taxes using True Values and/or Other Values. To calculate taxes, the user must first set up specific tax calculation templates. The templates can then be linked to jurisdictions, states or the property tax application system master record. In creating a tax calculation template, a distinction is made between True Value Controls and Other Value Controls.

Most states and/or jurisdictions use only one set of tax rates. In the property tax application, this first or only set of tax rates is preferably set up as the True Value Controls. The application's default terminology for this first or only set of tax rates is "True Value" (abbreviated as "TV"). The default terminology can be changed using the Labeling Template 220, which is discussed later.

Other states, such as Arizona, have two sets of tax rates. The first set is set up as the TV Controls. The second set can be set up as the Other Value Controls. The default terminology used by the application for this second set of tax rates is "Other Value" (abbreviated as "OV"). The default terminology can be changed using the Labeling Template 220.

The TV Controls and the OV Controls can be set up to calculate taxes independently of each other using different methods. This approach provides complete flexibility in setting up tax calculations. It also means that tax calculations are "exact" rather than calculated "estimates" of taxes. Using the Label Template 220, the default terminology used throughout the program can be customized to the specific state and/or jurisdiction terminology.

Creating a Tax Calculation Template

To create a tax calculation template 214, a Tax Calculation Template window 556 like the example shown in FIG. 33A is used. FIG. 33B shows an alternative configuration for a Tax Calculation Template window 558. Referring to FIG. 33 the user clicks once on the Add button 450 to add a template to the system. In the Template Name field 559, the user then enters an appropriate description for the new tax calculation template.

The Tax Calculation Template window 556 includes a TV Controls section 562. A checkmark in the Use TV In Calculations checkbox 564 indicates that TV will be used in calculating taxes. There are two mutually exclusive options for calculating taxes, i.e. using market value or using assessed value. If the Use Market Value button 566 is selected, the TV tax calculations will be based upon the market value before the assessment ratio has been applied to calculate the TV Assessed Value. Market value is sometimes referred to as the "full cash value" (FCV). If the Use Assessed Value button 568 is selected, the TV tax calculations will be based upon the TV Assessed Value. The assessed value is calculated by applying the assessment ratio to the market value.

A checkmark in the Use TV Equalization Ratio box 570 indicates that the equalization ratio will be used in the calculation of taxes regardless of whether the TV Market Value or the TV Assessed Value has been selected. The user must determine how to display the equalization ratio in the Eq. Ratio field displayed in the Assessment window 230 (FIG. 4). If the Percent button 572 is selected, the equalization ratio will be applied as a percent. For example, a 25.000000 in the Eq. Ratio field means that 0.25 (or 25%) of either the market or assessed values (depending which was previously selected for use) will be used in calculating taxes. If the Rate button 574 is selected, the equalization ratio will be applied as a rate. For example, a 0.250000 in the Eq. Ratio field means that 0.25 (25%) of either the market or assessed values will be used in calculating taxes.

A checkmark in the Use TV Assessment Ratio checkbox 576 indicates the TV Ratio will be applied against the TV Market Value (or TV Value) to calculate the TV Assessed Value. There are two sets of options that the user must determine for the tax calculation template. The first is whether to display the assessment ratio as a percent or a rate. The second is whether to use one assessment ratio against the entire TV Market Value or have separate assessment ratios for TV Land and TV Improvements, the total of which equals the TV Market Value. If the Percent button 572 is selected, the TV Assessment Ratio will be applied as a percent. For example, a 75.000000 in the TV Assessment Ratio field (see FCV Ratio field in FIG. 6) means that 0.75 (or 75%) of the market value will be used in calculating TV Assessed Values. If the Rate button 544 is selected, the TV Assessment Ratio will be applied as a rate. For example, a 0.750000 in the TV Assessment Ratio field means that 0.75 (75%) of the market value will be used in calculating TV Assessed Values.

If the Single TV Ratio button 578 is selected, there will be only one TV Assessment Ratio field in the parcel record (see FIG. 6). The value in this field (whether a rate or a percent) will be applied to the TV Market Value to calculate the TV Assessed Value. The Land field and the Improvement field (see FIG. 6) will be calculated using the same TV Assessed Value. If the Separate Ratios for Land & Improvements button 584 is selected, there will be two TV Assessment Ratio fields—one for land and one for improvements. Each respective ratio will be applied to its respective assessment value, either land or improvements, to calculate the assessed value. The total of the land and improvement assessed values will become the total TV Assessed Value.

There are three ways in which the TV District Tax Rates are displayed in the system for a given parcel record (see the Districts window 290 in FIG. 7), regardless of whether the rates are obtained from a District Record or Plugged Tax Rates. In the District Tax Rate Use section 586, if the Percent button 585 is selected, the TV District Tax Rate will be applied as a percent. For example, a 30.000000 in the TV District Tax Rate field means that taxes will be calculated at 0.30 (or 30%) of the applicable TV Value, either TV Market Value or TV Assessed Value after applying the ratios, if applicable. If the Rate button 587 is selected, the TV District Tax Rate will be applied as a rate. For example, a 0.300000 in the TV District Tax Rate field (see FIG. 7) means that taxes will be calculated at 0.30 (or 30%) of the applicable TV Value, either TV Market Value or Assessed Value after applying the ratios, if applicable. If the Millage button 588 is selected, the TV District Tax Rate will be applied on a per thousand basis. For example, a 300.000000 in the TV District Tax Rate field means that taxes will be calculated at 0.30 (or 30%) of the applicable TV Value, either TV Market Value or TV Assessed Value after applying the ratios, if applicable.

Still referring to FIG. 33, the Tax Calculations Template window 556 also includes an OV Controls section 563, which will now be discussed. A checkmark in the Use OV in Calculations checkbox 590 indicates that OV will be used in calculating taxes. The OV tax calculation is additive to the TV tax calculation. There are two mutually exclusive options for the OV tax calculations. If the Use Market Value button 567 is selected, the OV tax calculations will be based upon the OV Market Value before the assessment ratio has been applied to calculate the OV Assessed Value. If the Use Assessed Value button 569 is selected, the OV tax calculations will be based upon the OV Assessed Value. The assessed value is calculated by applying the OV Assessment Ratio to the OV Market Value.

A checkmark in the Use Equalization Ratio with OV checkbox 592 indicates that the Equalization Ratio will be applied to the OV Market Value or OV Assessed Value in calculating OV taxes. A checkmark in the Use OV Assessment Ratio checkbox 594 indicates that the OV Assessment Ratio will be applied against the OV Market Value (or OV Value) to calculate the OV Assessed Value. There are three mutually exclusive options, from which a user must select one, that will be used for the tax calculation template. If the Percent button 573 is selected, the OV Assessment Ratio will be applied as a percent. For example, a 75.000000 in the OV Assessment Ratio field (see LPV Ratio field in FIG. 6) means that 0.75 (or 75%) of the market value will be used in calculating OV Assessed Values. If the Rate button 574 is selected, the TV Assessment Ratio will be applied as a rate. For example, a 0.750000 in the OV Assessment Ratio field means that 0.75 (75%) of the market value will be used in calculating OV Assessed Values. If the Use TV Instead of OV Ratio button 596 is selected, the TV Assessment Ratio will be applied against the OV Market Value to calculate the OV Assessed Value.

There are five ways in which the OV District Tax Rates are displayed for a parcel record (see FIG. 45), regardless of whether the rates are obtained from a District Record or Plugged Tax Rates. If the Percent button 291 is selected, the OV District Tax Rate will be applied as a percent. For example, a 30.000000 in the OV District Tax Rate field 754 means that taxes will be calculated at 0.30 (or 30%) of the applicable OV Value, either OV Market Value or OV Assessed Value after applying the ratios, if applicable. If the Rate button 593 is selected, the OV District Tax Rate will be applied as a rate. For example, a 0.300000 in the OV District Tax Rate field means that taxes will be calculated at 0.30 (or 30%) of the applicable OV Value, either OV Market Value or OV Assessed Value after applying the ratios, if applicable. If the Millage button 595 is selected, the OV District Tax Rate will be applied on a per thousand basis. For example, a 300.000000 in the OV District Tax Rate field 754 means that taxes will be calculated at 0.30 (or 30%) of the applicable OV Value, either OV Market Value or OV Assessed Value after applying the ratios, if applicable. If the Use TV Instead of OV Rates button 596 is selected, the TV District Rates will be applied against the OV Market or Assessed Value to calculate the OV taxes. If the Ignore button 598 is selected, the OV District Rates are ignored and a value of 1 is substituted.

When the information in the tax calculations template has been completed, the user can click on the Commit button 452 to save the record. Alternatively, to clear all fields and start over, the user can click on the Reset button 454. To cancel input and restore the original field values, the user can click on the Cancel button 456.

Still referring to FIG. 33, if updating an existing tax calculation template, the user highlights the desired template in the scrollable template list 560 and clicks on the toolbar Update button 406, which will display the existing information stored in the database for the selected template. The user can then update the template fields as desired and save the updated template in the database 210 using the Commit button 452.

Linking the Tax Calculation Template

After a tax calculation template 214 is created, the user can link it to the system master record or to a state and/or a jurisdiction record. If several states or several jurisdictions within a state have the same tax calculation process as that defined in the tax calculation template, it is not necessary to recreate the template for each state or jurisdiction. It is only necessary to link the template to the correct state(s) and/or jurisdictions.

When linking tax calculation templates, the following rules again apply. Links to a jurisdiction record will take precedence over state or system master links. It is possible that a state, i.e. Arizona, will have a template and that a jurisdiction, such as Graham County, will also have a template link. It is also possible that a jurisdiction may have a link to a template, but the state in which the jurisdiction resides does not have a link. Links to a state will take precedence over a system master link. If a state has a link to a template, then all jurisdictions that do not have a specific tax calculation template link will use the template linked to the state. If a state or jurisdiction does not have a tax calculation template linked directly to it, the link to the system master record will prevail. Preferably, there will be at least one link to the system master record that defines a generic tax calculation process in the event that state or jurisdiction specific processes have not been defined.

Referring to FIGS. 33A and 33B, to create a link, the user highlights the tax calculation template to be linked in the scrollable template list 560 shown in the Tax Calculations window 556. The user then clicks on the Link To button 600, and the system displays the Tax Calculation Link To window 602 of FIG. 34.

In the Tax Calculation Link To window 602, the user clicks once on the Add button 450 to create a link. The user selects one of the following based upon which level the template is to be linked. The user selects the Jurisdiction level option 520 to link the template to a specific jurisdiction within a state, the State level option 522 to link the template to a specific state and the System Default level option 528 to link the template to the system master record. Information entered in a Start Year field 604 (default is 0000) and an End Year field 606 (default is 9999) sets the length of time that the template is valid. For example, a Start Year of 1998 and an End Year of 1999 means that the template will only be valid for that period of one year.

If the user has selected the System Default level option 528, then neither the State field 448 nor the Jurisdiction field 530 will be available. If the State level option 522 has been selected, then only the State field 448 will be available. The user selects the state to link to the template using a browser 554 as previously described and clicks on the Commit button 452 to enter the state in the State field 448. If the user has selected the Jurisdiction level option 520, then both the State field 448 and the Jurisdiction field 530 will be available and must be filled in. The user selects the state to link to the template and the jurisdiction (within the selected state) to link to the template and enters these into the relevant fields using browsers as previously described. When the fields are completed, the user can click on the Commit button 452 to save the record. Alternatively, to clear all fields and start over, the user can click once on the Reset button 454. To cancel the new input and restore the original field values, the user can click on the Cancel button 456. This process is repeated until all appropriate links for the selected template have been completed.

The Tax Calculation Link To window 602 includes the display of a Show object 518, in which there are several options that will determine what is displayed in the scrollable list 554. These options do not influence how a template is linked. The user selects one of the following options. If the All option 526 is selected, then all records (system master, state, and jurisdictions) with links to the selected template will be displayed. If the System Master option 524 is selected, then only one record will be displayed indicating that the template is linked to the system master record. If the State option 522 is selected, the only states that have a link to the selected template will be displayed. If the Jurisdiction option 520 is selected, then only jurisdictions that have a link to the selected template will be displayed.

Still referring to FIG. 34, to update an existing tax calculation template link, the user can highlight the desired template link in the scrollable template link list 554 and click once on the toolbar Update button 406, which will display the existing information stored in the database for the selected template link. The user can then update this information as desired and save it in the database 210 using the Commit button 452.

Installment Template

Installment rules templates 218 are used to set up payment rules that can be applied to specific states, jurisdictions or the system master record. A single installment template may have separate rules for the different assessment tracks, i.e. Real, Personal, Supplemental or NAV (non ad valorem). The installment template determines how tax installment rules are calculated based on the jurisdiction. It allows the user to calculate taxes in the accounts payable program of the application. The accounts payable program can be used to automatically generate tax installments, payments and discounts of any assessment type. Alternatively, the user may manually enter each line item in accounts payable.

Within the system, installment rules are defined at the state or local level. In the preferred embodiment, the system does not have a predefined installment template. If the user wishes to have the property tax application calculate accounts payable information for parcels, then the user can create at least one template and, at a minimum, link that template to the system master record. An installment template may have as many installments as necessary to meet the rules of a state or jurisdiction. Each installment may have a separate set of rules to define how that installment is calculated.

Creating an Installment Template

To create an installment template, the user uses an Installment Template window 608 like that shown in FIG. 35. As shown in the Installment Template window 608, there are two options for payment rules, i.e. a Standard Rules option 610 and an Advanced Rules option 612. Under the Standard Rules option 610, the current year tax is divided by the current year number of installments. The Advanced Rules option 612 includes several ways of deriving the installment amount as illustrated by the table below. The Numerator 634, Denominator 642 and Supplemental Type 648 may be used in any combination.

| Numerator | Denominator | Supplemental Type |
|---|---|---|
| Current Year Tax | Current Year # of Installments | % Current Tax |
| Previous Year Tax | Installments Left in Year | % Previous Tax |
| Current Year Balance | | Fixed Amount |

The Installment Template window 608 can be used as follows to create an installment rules template 218. The user clicks on the Template Name title bar 614, to activate that object and clicks on the Add button 450 to add a template. In the Template Name field 616, the user enters an appropriate description for the installment rules template 218 that is being created. To begin building the installment rules for the template, the user clicks on the Installment/Rule Description title bar 620, which activates this object. The user then selects the type of assessment track for creating the installment rules. Each installment template may have different installment rules for the four types of assessment tracks. The Real option 622 is selected to build installments for real property. The Personal option 624 is selected to build installments for real property. The Supplemental option 626 is selected to build installments for supplemental tracks. The NAV option 628 is selected to build installments for non ad valorem tracks. As shown in FIG. 35, if an arrow 630 is displayed underneath a track type option, it indicates that installment rules have been built for that track type.

The following process of building installment rules is the same regardless of the track type selected. To create an installment rule, the user clicks once on the toolbar Add button 450 located above the Installment/Rule Description object. The system tracks the installment number. For the installment being created, the user selects either the Standard Rules option 610 or the Advanced Rules option 612. The Standard Rules option 610 uses the total tax amount for the track divided by the number of installments. The Advanced Rules option 612 has different numerator, denominator and supplemental values. If the Advanced Rules option 612 is selected, the user selects the appropriate Numerator 634 from a drop down list box 632. As shown in the table above, the choices for the Numerator 632 are Current Year Tax, Previous Year Tax and Current Year Balance. For the Current Year Tax option, the current year is the year defined by the default settings in property maintenance. For the Previous Tax Year option, the previous year is one year prior to the year that is defined by the default settings in property maintenance. The Current Year Balance option is used primarily for the State of Virginia, which uses the Current Year Balance divided by number of installments left in the year to determine its third and fourth payments.

Also if the Advanced Rules option 612 is selected, the user selects a Denominator 642 from a drop down list box 640. The denominator choices are Current Year # of Installments and Installments Left in Year. The user can select a Supplemental Type 648 using a pull down list box 646 and select the appropriate additional value. A None option 648 is selected if there is no additional amount added to the installment, and the Supplemental Value field 650 will remain blank, A % Current Tax option is selected if a percent of the current year tax is added to the installment. With this option, the user enters in the Supplemental Value field 650 the percent to be added, i.e. 5.00 means 5%. A % Previous Tax option is selected if a percent of the previous year tax is added to the installment. With this option, the user enters in the Supplemental Value field 650 the percent to be added, i.e. 5.50 means 5.5%. A Fixed Amount option is selected if a fixed dollar amount is added to the installment. With this option, the user enters in the Supplemental Value field 650 the fixed dollar amount to be added, i.e. 5.50 means $5.50.

For the installment, the user also enters information into the fields in a Discount Date section 658, if applicable. This information includes the month in which the discount will occur, e.g. "04" is entered in the Month field 660 if the discount will occur in April. This field contains a question mark (?) if there is no discount for the installment. The day of the month the discount will be valid is entered into a Day field 662, e.g., if the discount will be valid on the $10^{th}$ day in April, a "10" is entered into the field. This field also contains a question mark (?) if there is no discount for the installment. The year in which the discount will be valid is selected from a Two Years Prior option 664, a Previous Year option 666, a Current Year option 668, a Next Year option 670 and a Two Years From option 672. For the Current Year option 668, the current year is defined by the default settings in the Property Maintenance window 230 (see FIG. 4). The user also selects the day on which to move the discount date if it falls on a holiday or weekend. The options include Prior Workday and Next Workday, which is the default value. In a Discount % field 674, the user enters the discount percentage, i.e. 2.00 means 2%. This field is left blank if there is no discount for the installment.

Still referring to FIG. 35, the user also enters information in an Installment Date section 676, including the month in which the installment will occur. The selections are similar to those for the Discount Date section 658. If bills for the particular assessment track are mailed throughout the year, the Month field and Day field should each contain a question mark (?). For example, in Arizona personal property bills are mailed monthly. Therefore, the installment date month contains a question mark (?).

To save the installment information entered for the new installment rules template being created, the user clicks on the Commit button 452. Alternately, clicking on the Reset button 454 will reset all the fields to their default values. Clicking on the Cancel button 456 will ignore all changes to the record and exit the add or update modes.

If there are more installments of the track type selected in the Installment Rules Template window 608 as described above, the user repeats the process for each installment for the same track type. After entering the installments for the selected track type, the user can select a new track type, i.e. Personal Property 624, Supplemental 626 or NAV 628, and begin to build the installment characteristics for that track type. There may be states and/or jurisdictions where the installment characteristics for a particular track type are the same as for another type. In that case, the user can use the Copy Installments window 680 (FIG. 37) discussed below. When the user has completed all the installment characteristics for each track type that has been built for the selected template, the user can click on the Exit button 490 to close the Installment Template window 608.

Still referring to FIG. 35, if updating an existing template, the user highlights the desired template in the scrollable list 618 and clicks on the Update button 406 above the list, which will display in the Installment Template window 608 the information stored in the database for the selected template. The user can then update this information as desired and save it in the database 210 using the Commit button 452.

Linking an Installment Template

After an installment rules template 218 is created, it must be linked to the system master record, a state record or jurisdiction record. When linking installment templates, the hierarchy rules previously described apply. Installment template links to a jurisdiction will take precedence over state or system master links. It is possible that a state, i.e. Arizona, will have a template and that a jurisdiction, such as Maricopa, will also have a template link. It is also possible that a jurisdiction may have a link to an installment template but the state in which the jurisdiction resides does not have a link. Links to a state will take precedence over a system master link. If a state has a link to a template, then all jurisdictions that do not have a specific template link will use the template linked to the state. If a state or jurisdiction does not have a template linked directly to it, the link to the system master record will prevail. If there is no link for a particular state or jurisdiction in which a property resides, the Auto Add feature 350 in the Accounts Payable window 348 will not allow the user to automatically create installment information. However, the user may manually create installment information in the Accounts Payable window 348.

Referring to FIG. 35, to define an installment template link, the user highlights the template to be linked in the scrollable list 618 in the Installment Template window 608. When the user clicks on the Link To button 600, the system displays the Installment Template Link To window 682 of FIG. 36. The user clicks on the Add button 450 in the Installment Template Link To window 682 to create a link.

The user then selects one of the following based upon which level the template will be linked. The Jurisdiction link option 520 is selected to link the template to a specific jurisdiction within a state. The State link option 522 is selected to link the template to a specific state. The System Default link option 528 is selected to link the template to the system master record. The available data entry fields will depend on which link option is selected. If the user selected the System Default link option 528, then neither the State field 448 nor the Jurisdiction field 530 will be available. If the user selected the State link option 522, then only the State field 448 will be available, and the user can use the browser 554 as previously described to select the state to be linked to the template and enter it in the State field 448. If the user selected the Jurisdiction link option 522, then the State field 448 and the Jurisdiction field 530 will be available and must be filled in. Again, the user can use browsers as previously described to enter a selected state and jurisdiction (within the selected state) in these fields, respectively. When the fields have been completed, the user can click on the Commit button 452 to save the record. To clear all fields and start over, the user can click on the Reset button 454. To cancel input and restore the original field values, the user can click on the Cancel button 456. The process can then be repeated until all appropriate links for the selected template have been completed.

Frequently, the installment rules for real property will be same as those for personal property, supplemental or NAV taxes. The property tax application provides the user the flexibility to build different installment rules for each track type or, when they are the same, to copy one track's installments to another track. To do this, the user highlights the appropriate installment template in the Installment Template window 608 (FIG. 35) and selects the appropriate source track option. For example, if the user wants to use the Real source track, he or she selects the Real radio button 622 and the Real track's installments will be displayed in the Installment Template window 608. The user then clicks on the Copy Installments button 678, which will display a Copy Installments dialog box 680 like that shown in FIG. 37. The Copy Installments dialog box 680 includes a list of all tracks without installments and a list of tracks that will have installments copied to them from the source track. FIG. 37 depicts an example where the Real track was selected as the source track and the NAV, Personal and Supplemental tracks do not have installments built and may be eligible for copying installments from the source track. In a Tracks With No Installments list box 684, the user highlights the tracks to which the source track installments will be copied and clicks on an Add button 685 to move the tracks to the Tracks to Copy list box 686. Clicking on the Copy Now button 688 then copies the source track installments to the target tracks.

Referring again to FIG. 36, the Installment Templates Link To window 682 includes a Show object 518, which has several options that will determine what is displayed in a scrollable list box in the window. These options do not influence how a template is linked. If the All option 526 is selected, then all records (system master, state, and jurisdictions with links to the selected template will be displayed. If the System Master option 524 is selected, then only one record will be displayed indicating that the template is linked to the system master record. If the State option 522 is selected, the only states that have a link to the selected template will be displayed. If the Jurisdiction option 520 is selected, then only jurisdictions that have a link to the selected template will be displayed.

Still referring to FIG. 35, to update an existing installment template link, the user can highlight the desired template link in the scrollable template link list 554 and click once on the toolbar Update button 406, which will display the existing information stored in the database for the selected template link. The user can then update this information as desired and save it in the database 210 using the Commit button 452.

Appeal Control

The property tax system also stores and manages information relating to property tax appeals. In accordance with the invention, the system can be adapted to any appeals procedures in any state or taxing jurisdiction. With this feature, a user can elect to use the property tax system to manage appeals and/or give the user's tax counsel access to the system for managing appeals. To create and manage appeal information, the system uses appeal control templates 216, which are set up by the user for those states or jurisdictions in which active appeal cases exist.

Appeals are attached to assessment tracks. Therefore, before creating an appeal record, the user also must create the associated assessment track. The system uses the results of an appeal to update the assessment track. Also before creating an appeal record, the user first set up the basic information for the appeal records, such as whether the user will be using working professionals, reason codes, consultants, appellant codes and appeal codes, as previously discussed.

Defining an Appeal Control Template

After the user has set up the appeal information, an appeal control template 216 can be created. There are three basic steps to this process. They include defining an appeal control template, defining the appeal levels for an appeal control template, and linking the template to the system master, a state, or jurisdiction. The appeal control template 216 mirrors the appeal process of a particular state and/or jurisdiction. FIG. 39 is a flow diagram illustrating the steps of the process by which a user of the system creates an appeal control template and links it to its state or jurisdiction.

To create an appeal control template 216 and appeal levels, the user utilizes an Appeal Control Template window 694 like the example shown in FIG. 40. To add a new appeal control template the user clicks on the Appeal Control Template title bar 696, which activates the Appeal Control Template object. The user then clicks on the Add button 450 to create a new appeal control template. In the Description field 702, the user enters a description of the new appeal control template. Clicking on the Commit button 452 saves the record to the database. Alternatively, to clear all fields and start over, the user can click on the Reset button 454. To cancel input and restore the original field values, the user clicks on the Cancel button 456.

If updating an existing template, the user highlights the desired template description in the scrollable appeal control template list 700 and clicks on the Update button 406 above the Appeal Control Template title bar 696, which will display the existing information stored in the database for the selected template. The user can then update this information as desired and save it in the database 210 using the Commit button 452.

Defining Appeal Levels

Once the user has created or selected an existing appeal control template as described above, the next step is to define the appeal levels for that template. This information is available from the state and/or jurisdiction for which the user is creating the appeal process. Still referring to FIG. 40, to set up appeal levels the user clicks on the Appeal Levels title bar 704, activating that object. The user clicks on the Add button 450 above the Appeal Levels title bar 704 to create an appeal level for the selected appeal control template. In the Level field 708, the user enters the number of the appeal level being created. For example, if the user is creating the first level of the appeal process, a "1" is entered in this field. If the user is creating the second level of the appeal process, a "2" is entered in this field. In the Description field 710, the user enters the description of the appeal level that is being creating. In the Max Hearings field 712, the user enters the maximum number of allowable hearings of the appeal level that is being created. The user also selects one of three litigation options, i.e. an Always option 716, a Sometimes option 718 and a Never option 720. If the Always option 716 is selected, then there will always be litigation at this level. If the Sometimes option 718 is selected, then there may or may not be litigation at this level. If the Never option 720 is selected, then there will not be litigation at this level. Clicking on the Commit button 452 above the Appeal Levels title bar 704 saves the record. Alternatively, to clear all fields and start over, the user can click on the Reset button 454. To cancel input and restore the original field values, the user clicks on the Cancel button 456. The user repeats this process until all levels for the selected appeal control template have been built.

If updating an existing appeal level, the user highlights the appropriate Level/Description in the scrollable list 706 and clicks on the Update button 406 above the Appeal Levels title bar 704, which will display the existing information stored in the database for the selected appeal level. The user can then update this information as desired and save it in the database 210 using the Commit button 452.

Linking an Appeal Control Template

After an appeal control template 216 is built, the user links it to one of the system master record, a state or a jurisdiction within a state. If several states or several jurisdictions within a state have the same appeal process as that defined in the appeal control template, it is not necessary to recreate the template for each state or jurisdiction. It is only necessary to link the template to the correct state(s) or jurisdictions.

Again, within the system, appeal control template links to a jurisdiction will take precedence over state or system master links. It is possible that a state, i.e. Arizona, will have a template and that a jurisdiction, such as Maricopa, will also have a template link. It is also possible that a jurisdiction may have a link to a template but the state in which the jurisdiction resides does not have a link. Links to a state will take precedence over a system master link. If a state has a link to a template, then all jurisdictions that do not have a specific appeal control template link will use the template linked to the state. If a state or jurisdiction does not have a template linked directly to it, the link to the system master record will prevail. Preferably, there is one link to the system master record that defines a generic process in the event that state or jurisdiction specific processes have not been defined.

Referring again to FIG. 40, to create a link the user clicks on the Appeal Control Template title bar 696 and selects from the scrollable list 700 the appeal control template to be linked. The user then clicks on the Link To button 600, and the system then displays an Appeal Control Link window 722 like that of FIG. 41.

Referring to FIG. 41, the user clicks once on the Add button 450 to create the appeal control template link. The user then selects one of the following linking options based upon the level at which the user wants to link the template. The Jurisdiction level option 521 is selected to link the template to a specific jurisdiction within a state. The State level option 522 is selected to link the template to a specific state. The System Default level option 528 is selected to link the template to the system master record. If the user has selected the System Default level option 528, then neither the State field 448 nor the Jurisdiction Code field 530 will be available. If the user has selected the State option 522, then only the State field 448 will be available. The user can then select the State field 448, such as by double clicking on it, which will display a browser with a list of states stored in the database 210. The user can highlight the state to link to the template and click once on the Commit button 452 to select the state and return to the Tax Year Template window 504. If the user selected the Jurisdiction level option 521, then both the State field 448 and Jurisdiction Code field 530 will be available and must be filled in the manner previously described, which can be accomplished using a browser display of states and a browser display of jurisdictions (within the selected state). The user enters in the Start Year field 604 (default is 0000) and the End Year field 606 (default is 9999) years to define the length of time that the appeal control template is valid. For example, a start year of 1998 and an end year of 1999 means that the template will only be valid for that period of one year. To save the record, the user clicks once on Commit button 452. Alternatively, to clear all fields and start over, the user clicks once on the Reset button 454. To cancel input and restore the original field values, the user clicks once on Cancel button 456. The user can then repeat the above process until all appropriate links for the selected tax year template have been completed.

The Appeal Control Link window 722 includes a Show object 518, which has several options that will determine what is displayed in a scrollable list box 554. These options do not influence how a template is linked. If the All option 526 is selected, then all records (system master, state, and jurisdictions with links to the selected template will be displayed. If the System Master option 524 is selected, then only one record will be displayed indicating that the template is linked to the system master record. If the State option 522 is selected, the only states that have a link to the selected template will be displayed. If the Jurisdiction option 520 is selected, then only jurisdictions that have a link to the selected template will be displayed.

Still referring to FIG. 41, to update an existing appeal control template link, the user can highlight the desired template link in the scrollable template link list 554 and click once on the toolbar Update button 406, which will display the existing information stored in the database for the selected template link. The user can then update this information as desired and save it in the database 210 using the Commit button 452.

With the templates created and linked to their respective states or jurisdictions, the user can track appeals. If the user is not tracking appeals in the property tax application, then it is not necessary to set up appeal control templates. It is preferable, however, that appeals be tracked in the property tax application because values of an appeal decision are used to calculate accounts payable obligations and for budgeting.

Label Templates

The property tax application can accommodate multiple states and jurisdictions, not all of which use the same terminology. Dynamic label templates 220 provide unique data field labeling capabilities for customizing the property tax application screens to use different state and/or jurisdiction terminology.

After building jurisdiction records and attaching payees to jurisdictions, a user can determine whether the jurisdictions use different naming conventions. For example, some states refer to the primary value of a property as its 'true value.' In Arizona, the 'true value' is called 'full cash value.' The user may set up these naming conventions and attach them to their applicable state or jurisdiction(s) using label templates. Often all jurisdictions within a state will use the same naming conventions. If this is the case, the user can attach the label template to a state rather than individual jurisdictions. The naming conventions may be the same between states. If this is the case, then the user can set up only one label template and attach multiple states to that template. Using label templates is not a requirement of the property tax application. The system will default to a standard set up labels that are predefined in property tax application.

FIG. 42 shows a flow diagram for setting up dynamic labeling and taxing districts within jurisdictions. After setting up label templates, the next step is to set up the specific taxing districts and their corresponding rates within jurisdictions, as previously described. The user only needs to set up taxing districts if, for example, a property has more than one taxing district or if you have many properties in the same taxing district. In this case, it may be easier to set up the district once and attach the district to each property. The alternative to setting up district rates and attaching the district to a parcel record is to plug the rates into the parcel record.

Creating a Label Template

To create or update a label template, the user utilizes a Label Template window 726, an example of which is shown in FIG. 43A. FIG. 43B shows an alternative configuration of a Label Template window 726. Referring to FIG. 43, the Label Template window includes a Label Templates section 730 and a Label List section 732. The Label Templates section 730 displays the existing label templates 220 stored in the database 210 in a scrollable list 728. The Label List section 732 displays a scrollable list 740 of the default labels for the fields used throughout the system, as well as the corresponding new label that has been given to each field in the template highlighted in the Label Template scrollable list box 728.

To create a label template, the user clicks on the Label Templates title bar 730 and then clicks on the Add button 450. In the Label Name field, the user then enters an appropriate name for the new label template and clicks on the Commit button 452 to save the record. The user then highlights the Label List title bar 732. The Label list box 740 is a scrollable list box with two columns, i.e. a Label column 734 and a New Label column 736. The Label column 734 stores the default label values seeded into the system fields. The New Label column 736 is used to enter the new label to be used in place of the relevant default label. The Label list box 740 contains 63 different labels that are used throughout the system. This list is displayed in the following table:

| Field | Default Label |
|-------|---------------|
| 1 | Asd OV |
| 2 | Asd TV |
| 3 | Asd TV Imp |
| 4 | Asd TV Land |
| 5 | Asd!TV Imp |
| 6 | Asd!TV Land |
| 7 | Decision OV Ratio |
| 8 | Decision!OV!Ratio |
| 9 | OV |
| 10 | OV Dst Tax Rate Use |
| 11 | OV Dst Tax!Rate Use |
| 12 | OV ER Treatment |
| 13 | OV ER!Trmnt |
| 14 | OV Increase |
| 15 | OV Rate |
| 16 | OV Rate Increase |
| 17 | OV Ratio |
| 18 | OV Ratio Treatment |
| 19 | OV Ratio!Trmnt |
| 20 | OV Val Type |
| 21 | OV!Rate |
| 22 | OV!Ratio |
| 23 | Owner's OV Estimate |
| 24 | Owner's TV Estimate |
| 25 | PP OV |
| 26 | PP TV |
| 27 | Prop Cd |
| 28 | Region |
| 29 | Requested Asd OV |
| 30 | Requested Asd TV |
| 31 | Requested OV |
| 32 | Requested OV Ratio |
| 33 | Requested TV |
| 34 | Requested!Asd TV |
| 35 | TV |
| 36 | TV Dst Tax Rate Use |
| 37 | TV Dst Tax!Rate Use |
| 38 | TV ER Treatment |
| 39 | TV ER!Trmnt |
| 40 | TV Imp |
| 41 | TV Imp Ratio |
| 42 | TV Imp!Ratio |
| 43 | TV Increase |
| 44 | TV Land |
| 45 | TV Rate |
| 46 | TV Rate Increase |
| 47 | TV Ratio |
| 48 | TV Ratio Treatment |
| 49 | TV Ratio!Trmnt |
| 50 | TV Val Type |
| 51 | TV!Rate |
| 52 | Use Cd |
| 53 | Use ER with OV |
| 54 | Use OV Asmt Ratio |
| 55 | Use OV In Calculations |
| 56 | Use OV!Asmt Ratio |
| 57 | Use Ov!In Calc |
| 58 | Use TV Asmt Ratio |
| 59 | Use TV ER |
| 60 | Use TV In Calculations |
| 61 | Use TV!Asmt Ratio |
| 62 | Use TV!In Calc |
| 63 | Vol |

In this table, any Default Label with an exclamation point (!) in it indicates a column header. When renaming a column header, the user leaves in the exclamation points for indicating column headers. When the user has completed all of the modifications for a particular label template, selecting the Exit button 490 will cause the system to close the Label Template window 726.

Still referring to FIG. 43, if updating an existing template, the user highlights the template description in the scrollable list 728 and selects the Update button 406. This will display in the Label List section 732 the existing new label information stored in the database for the selected template. The user can then click on the Commit button 452 to save the record in the database 210.

Linking a Label Template

After a label template 220 is created, it must be linked to the system master record, a state record or jurisdiction record. The same hierarchy rules as previously described apply. Label template links to a jurisdiction will take precedence over state or system master links. It is possible that a state, i.e. Arizona, will have a template and that a jurisdiction, such as Maricopa, will also have a template link. It is also possible that a jurisdiction may have a link to a template but the state in which the jurisdiction resides does not have a link. Links to a state will take precedence over a system master link. If a state has a link to a template, then all jurisdictions that do not have a specific template link will use the template linked to the state. If a state or jurisdiction does not have a template linked directly to it, the link to the system master record will prevail. It is not necessary to have a label template attached to the system master record. For those states and jurisdiction without a specific label template, the system defaults will be displayed.

Referring again to FIG. 43, to define a link to a label template 220, the user highlights the template to be linked in the Label Templates scrollable list 728. Clicking on the Link To button 600 causes the system to display a Label Template Link window 742 for the selected template, an example of which is shown in FIG. 44. The Label Template Link window 742 operates similarly to the link windows previously described. Using the Label Template Link window 742, the user can select the linking level option, i.e. the Jurisdiction level option 521, the State level option 523 or the System Default level option 528 and link the template at the appropriate level. This process is repeated until appropriate links for the selected template have been completed.

The Label Template Link window 742 also can be used to update existing links stored in the database 210, as previously described.

CONCLUSION

As will be apparent from the foregoing, the above-described method and system for managing multi jurisdictional property tax information possesses numerous advantages. While certain preferred embodiments and methods of the invention have been described, these embodiments and methods have been presented by way of example only, and are not intended to limit the scope of the present invention. Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A system for managing property tax information for a plurality of real estate parcels in a plurality of jurisdictions and tax districts:
    a data storage device;
    an output device; and
    a processor programmed to:
    maintain in the storage device a database of property tax data of properties in a plurality of jurisdictions and tax districts in a state including a plurality of parcel records in a plurality of jurisdictions and tax districts, each parcel record including a parcel identifier for identifying a parcel of the plurality of real estate parcels, a tax year identifier for identifying the tax year applicable to the parcel, and a jurisdiction identifier for identifying a jurisdiction within the state in which the parcel is located,
    maintain in the storage device a plurality of tax rule templates wherein a tax rule template of the plurality of templates is associated with a tax assessing or billing entity, the template defines tax rules specific to the associated entity, and the template is linked to at least one of a state record for the state in which the parcel is located, a jurisdiction record for a jurisdiction within the state in which the parcel is located or a system master record, wherein the plurality of templates includes a valuation template for defining data entry rules, and an appeals template for defining property tax appeal information,
    receive an input requesting a report of information for a specified parcel record,
    automatically retrieve a tax rule template from the stored plurality of tax rule templates based on the tax year identifier and the jurisdiction identifier of the specified parcel,
    generate the requested report using the property tax rules from the retrieved template, and
    output the requested property tax report to the output device.

2. The system of claim 1 wherein the plurality of templates includes an installment template for defining installment payment rules.

3. The system of claim 1 wherein the plurality of templates includes a revaluation template for defining a revaluation cycle.

4. The system of claim 1 wherein the plurality of templates includes a tax year template for defining the beginning and end dates of a tax year.

5. The system of claim 1 wherein the plurality of templates includes a label template for defining naming conventions for a state or jurisdiction.

6. The system of claim 1 wherein the processor programmed to automatically retrieve a template from the stored templates is programmed to search the stored templates for a template having a link that matches the first of:
    a tax year applicable to the selected parcel, the state in which the selected parcel is located, and the jurisdiction associated with the specified parcel; or
    a tax year applicable to the selected parcel and the state in which the selected parcel is located; or
    a tax year applicable to the selected parcel.

7. A method for managing property tax information for a plurality of taxing jurisdictions and tax districts, the method comprising:
    maintaining in a computer storage device a database of property tax data including a plurality of parcel records in a plurality of jurisdictions and tax districts in a state, each parcel record including a parcel identifier for identifying a parcel of the plurality of real estate parcels, a tax year identifier for identifying the tax year applicable to the parcel, and a jurisdiction identifier for identifying a jurisdiction within the state in which the parcel is located;

maintaining in the storage device a plurality of tax rule templates wherein a tax rule template of the plurality of templates is associated with a tax assessing or billing entity, the template defines tax rules specific to the associated entity, and the template is linked to at least one of a state record for the state in which the parcel is located, a jurisdiction record for a jurisdiction within the state in which the parcel is located or a system master record, wherein at least one of the plurality of tax rule templates is a tax calculation template for calculating property taxes;

receiving an input requesting a report of information for a specified parcel record;

automatically retrieving a tax rule template from the stored plurality of tax rule templates based on the tax year identifier, and the jurisdiction identifier of the specified parcel;

generating the requested report using the property tax rules from the retrieved template; and outputting the requested report to the output device.

8. The method of claim 7 wherein the step of maintaining in the storage device a plurality of templates includes maintaining a valuation template for defining data entry rules.

9. The method of claim 7 wherein the step of maintaining in the storage device a plurality of templates includes maintaining an appeals template for defining property tax appeal information.

10. The method of claim 7 wherein the step of maintaining in the storage device a plurality of templates includes maintaining an installment template for defining installment payment rules.

11. The method of claim 7 wherein the step of maintaining in the storage device a plurality of templates includes maintaining a revaluation template for defining a revaluation cycle.

12. The method of claim 7 wherein the step of maintaining in the storage device a plurality of templates includes maintaining a tax year template for defining the beginning and end dates of a tax year.

13. The method of claim 7 wherein the step of maintaining in the storage device a plurality of templates includes maintaining a label template for defining naming conventions for a state or jurisdiction.

14. The method of claim 7 wherein the step of automatically retrieving a template from the stored templates includes searching the stored templates for a template having a link that matches the first of:

a tax year applicable to the selected parcel, the state in which the selected parcel is located, and the jurisdiction associated with the specified parcel; or a tax year applicable to the selected parcel and the state in which the selected parcel is located; or a tax year applicable to the selected parcel.

15. In a system for managing property tax information for a plurality of real estate parcels in a plurality of jurisdictions and tax districts, a computer-readable medium having stored thereon:

a database of property tax data including a plurality of parcel records in a plurality of jurisdictions and tax districts in a state, each parcel record including a parcel identifier for identifying a parcel of the plurality of real estate parcels, a tax year identifier for identifying the tax year applicable to the parcel, and a jurisdiction identifier for identifying a jurisdiction within the state in which the parcel is located; and a plurality of templates wherein a tax rule template of the plurality of templates is associated with a tax assessing or billing entity, the template defines tax rules specific to the associated entity, and the template is linked to at least one of a state record for the state in which the parcel is located, a jurisdiction record for a jurisdiction within the state in which the parcel is located or a system master record, wherein the plurality of templates includes a tax calculation template for calculating property taxes.

* * * * *